United States Patent
Zhang et al.

(10) Patent No.: US 12,268,980 B2
(45) Date of Patent: Apr. 8, 2025

(54) NANOFIBER FILTER MEDIUM FOR REUSABLE FACEMASK AND FILTERING FACEPIECE RESPIRATOR

(71) Applicant: UCHICAGO ARGONNE, LLC, Chicago, IL (US)

(72) Inventors: Yuepeng Zhang, Naperville, IL (US); Devon J. Powers, Lemont, IL (US); Krzysztof Pupek, Plainfield, IL (US); John N. Hryn, Hawthorn Woods, IL (US); Gregory K. Krumdick, Homer Glen, IL (US); Santanu Chaudhuri, Countryside, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 269 days.

(21) Appl. No.: 17/039,188

(22) Filed: Sep. 30, 2020

(65) Prior Publication Data
US 2022/0096975 A1   Mar. 31, 2022

(51) Int. Cl.
*B01D 3/08* (2006.01)
*A62B 17/00* (2006.01)
(Continued)

(52) U.S. Cl.
CPC ........... *B01D 39/083* (2013.01); *A62B 17/00* (2013.01); *A62B 23/02* (2013.01);
(Continued)

(58) Field of Classification Search
CPC .............. B01D 39/083; B01D 46/0028; B01D 2239/025; B01D 2239/0442;
(Continued)

(56) References Cited

U.S. PATENT DOCUMENTS

| 7,942,957 B2 * | 5/2011 | Lee ..................... A01N 43/80 |
| | | 427/430.1 |
| 9,446,547 B2 | 9/2016 | Lustenberger |

(Continued)

FOREIGN PATENT DOCUMENTS

| CN | 111528553 A * | 8/2020 | ......... A41D 13/1192 |
| ES | 2765374 A1 * | 6/2020 | ......... A41D 13/1192 |

(Continued)

OTHER PUBLICATIONS

Itoh et al. (ANTEC 2011 Plastics: Annual Technical Conference Proceedings. (pp. 1121-1124). Society of Plastics Engineers (SPE). Retrieved from https://app.knovel.com/hotlink/pdf/id:kt00946131/antec-2011-plastics-annual/structure-morphology (Year: 2011).*
(Continued)

*Primary Examiner* — Jonathan Miller
(74) *Attorney, Agent, or Firm* — MARSHALL, GERSTEIN & BORUN LLP

(57) ABSTRACT

Reusable filters for personal protective equipment (PPE) may prevent shortages of PPE and save fabrication time, resources, and money. Disclosed is a method and system for fabrication of nanofiber filter media for PPE. The method includes positioning a substrate to receive nanofibers thereon, providing a voltage gradient in a region of the substrate, and electrospinning nanofibers onto the substrate. The methods and associated systems allow autoclaving of the filter medium at temperatures of up to 300 degrees for sanitizing the filter medium. Additionally, the methods and associated system allow for the inclusion of an anti-pathogen agent in the nanofiber filter media.

16 Claims, 15 Drawing Sheets

(51) Int. Cl.
    *A62B 23/02*     (2006.01)
    *B01D 39/08*     (2006.01)
    *B01D 46/00*     (2022.01)

(52) U.S. Cl.
    CPC .... *B01D 46/0028* (2013.01); *B01D 2239/025* (2013.01); *B01D 2239/0442* (2013.01); *B01D 2239/0631* (2013.01); *B01D 2239/065* (2013.01); *B01D 2239/10* (2013.01); *B01D 2239/1233* (2013.01); *B01D 2279/65* (2013.01)

(58) Field of Classification Search
    CPC ...... B01D 2239/0631; B01D 2239/065; B01D 2239/10; B01D 2239/1233; B01D 2239/0622; B01D 2239/0627; B01D 2239/0654; B01D 2279/65; A62B 17/00; A62B 23/02; A62B 23/00; A62B 23/025; A62B 23/06; B32B 5/022; D10B 2505/04
    See application file for complete search history.

(56) References Cited

U.S. PATENT DOCUMENTS

| | | | | |
|---|---|---|---|---|
| 2010/0028606 | A1* | 2/2010 | Nishida | B23K 26/0732 |
| | | | | 428/156 |
| 2011/0174158 | A1* | 7/2011 | Walls | D01D 5/0092 |
| | | | | 96/60 |
| 2011/0259813 | A1* | 10/2011 | Wertz | B01D 39/1615 |
| | | | | 264/510 |
| 2013/0197664 | A1* | 8/2013 | Ballard | B01D 39/04 |
| | | | | 623/23.72 |
| 2013/0310428 | A1* | 11/2013 | Joseph | A01N 43/80 |
| | | | | 514/417 |
| 2014/0250846 | A1* | 9/2014 | Walls | A62B 23/025 |
| | | | | 128/206.17 |
| 2015/0044464 | A1* | 2/2015 | Joo | D01F 1/10 |
| | | | | 428/401 |
| 2016/0174631 | A1* | 6/2016 | Tong | A01N 25/34 |
| | | | | 427/457 |
| 2016/0193555 | A1 | 7/2016 | Park | |
| 2017/0252590 | A1* | 9/2017 | Angadjivand | A62B 23/025 |
| 2018/0297011 | A1* | 10/2018 | Coignet | B01J 20/26 |
| 2018/0362413 | A1* | 12/2018 | Hall | C04B 35/5622 |
| 2019/0160404 | A1* | 5/2019 | Smithies | B32B 27/34 |
| 2019/0207248 | A1* | 7/2019 | Ohta | H01M 4/1395 |
| 2020/0254371 | A1* | 8/2020 | Yung | A62B 23/02 |
| 2020/0360645 | A1* | 11/2020 | Heimbuch | A61M 16/0605 |
| 2021/0337892 | A1* | 11/2021 | Kern | A41D 13/1161 |

FOREIGN PATENT DOCUMENTS

| | | | | |
|---|---|---|---|---|
| KR | 20090074946 A | * | 10/2011 | |
| KR | 20200076241 A | * | 6/2020 | |
| WO | WO-2014206789 A1 | * | 12/2014 | ......... B01D 39/1623 |

OTHER PUBLICATIONS

WO2014206789A1_ENG (Espacenet machine translation of Riou) (Year: 2014).*
CN111528553A_ENG (Espacenet machine translation of Cao) (Year: 2020).*
KR20090074946A_ENG (KIPRIS machine translation of Lee) (Year: 2009).*
ES2765374A1_ENG (Espacenet machine translation of Lagaron) (Year: 2020).*
Itoh et al. (2011. ANTEC 2011 Plastics: Annual Technical Conference Proceedings—Structure and Morphology of Nylon 6 Fibers Produced by Nozzle-Less Electrospinning. (pp. 1121-1124). Society of Plastics Engineers (SPE)) (Year: 2011).*
KR20200076241A_ENG (Espacenet machine translation of Koh) (Year: 2020).*
KR20090074946A_ENG (KIPRIS machine translation of Lee) (Year: 2011).*
ES2765374A1_ENG (Espacenet mahine translation of Lagaron) (Year: 2020).*
ESpin Nanofibers, eSpain Technologies, Inc., downloaded from the Internet at: <http://espintechnologies.com/> (2011).
N95/N99 Nanofiber Filtration Media, Inovenso, downloaded from the Internet at: <https://www.inovenso.com/nanofiber-facemask/nanofiber-facemask/ (2007).

* cited by examiner

NANOFIBER FILTER MEDIUM FOR REUSABLE FACEMASK AND FILTERING FACEPIECE RESPIRATOR

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to methods and systems for fabricating reusable personal protective equipment (PPE), and more specifically to a nanofiber reusable filter for use in PPE.

BACKGROUND

Personal protective equipment (PPE) is protective gear that is designed to protect a wearer of the PPE from hazards, harm, and injury. PPE may be designed to protect a wearer from physical, electrical, chemical, biohazardous, airborne, radiation, or other forms of hazards. PPE may be clothing, gloves, helmets, goggles, etc. that is worn depending on the specific hazards of a given situation. Many workplaces and environments present hazards on a daily basis and therefore PPE is very important in a multitude of settings. For example, steel toed boots and hard hats may be used on a construction site to reduce the risk of physical injury. In another example, a facemask and protective face shield may be used in an operating room to prevent potential infection or reduce the exposure to biohazardous materials.

Some types of PPE, such as steel-toed boots and lab coats, are reusable, while other types of PPE, such as latex gloves and surgical masks, are generally not reusable. Constantly replacing single use PPE can become expensive and it requires diligence to maintain a steady supply of single use PPE. Additionally, in times of a crisis or shortage, for example, during a pandemic, some PPE may be in high demand and specifically single use PPE may be in short supply. In some scenarios, single use PPE may be unavailable and people may be forced to put themselves at risk to perform essential duties such as providing health care to an infected individual. Therefore, professionals across many industries, such as health services providers, would benefit from reusable PPE where single use PPE is currently the only option or industry standard.

SUMMARY OF THE DISCLOSURE

A reusable filtration element for personal protective equipment includes a flexible substrate having a layer of electrospun nanofibers on a surface of the flexible substrate. The nanofibers may include polymer nanofibers having diameters of 2 micrometers or less. The layer of nanofibers may have a thickness between 10 and 100 micrometers. Further, the reusable filtration element may include an anti-pathogen such as an anti-bacterial or anti-viral agent. The reusable filtration element is structurally stable up to 300° C. The reusable filtration element has a filtration efficiency of >95% against polydispersed NaCl particles of average mean mass diameter of 0.26 μm under a face velocity of ~23 cm/s with a pressure drop of less than 25 mmH$_2$O.

A method for fabricating a reusable filtration element for personal protective equipment includes physically configuring a flexible substrate relative to a nozzle. The flexible substrate is configured to receive nanofibers by electrospinning of nanofibers onto the substrate. The method further includes providing a voltage between the flexible substrate and a region adjacent to the nozzle and pumping a material through the nozzle to electrospin a layer of nanofibers onto the flexible substrate. The layers of nanofibers may include polymer nanofibers having diameters of 2 micrometers or less. Additionally, the reusable filtration element may include an anti-pathogen such as an anti-bacterial or anti-viral agent.

DETAILED DESCRIPTION

Figure 1A:
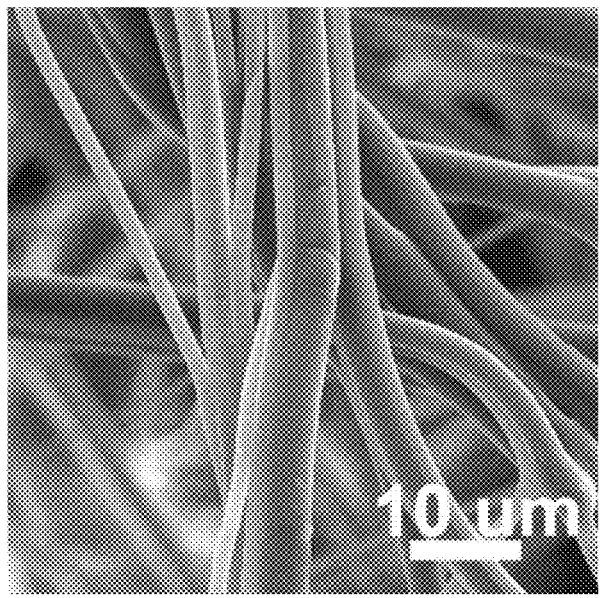
FIG. 1A is a prior art scanning electron microscope (SEM) image of micron diameter filter fibers for use in filters for personal protective equipment (PPE).
Figure 1B:
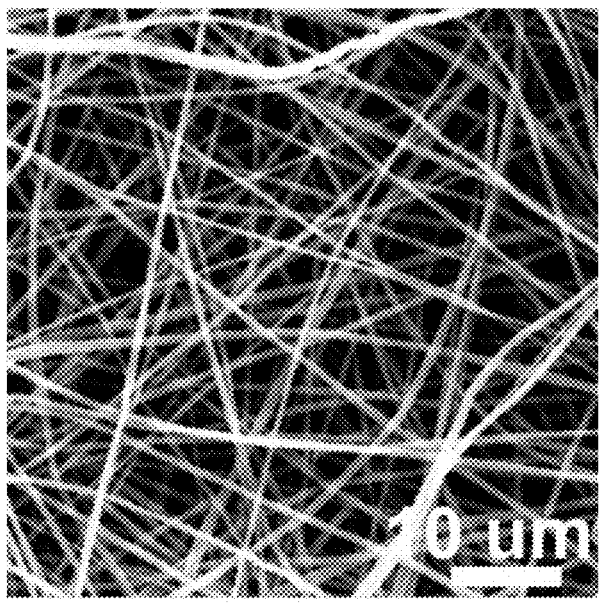
FIG. 1B is an SEM image of sub-micron diameter filter fibers for use in filters for PPE.

Personal protective equipment (PPE) may be used to protect a wearer of the PPE from various types of hazards. Some PPE, such as facemasks and air filters, are designed specifically to prevent or reduce the exposure of a person to chemical hazards, viruses, or other airborne contaminants and particulate. The demand for PPE may increase during times of an equipment shortage or during a crisis such as a pandemic, mass shooting, terrorist attack, or natural disaster. The ability to safely reuse PPE may prevent a potential shortage of PPE during times of high demand which may save lives and prevent potential illness and health complications for medical professionals, first responders, and civilians alike. Typical N95 facemasks and respirators for PPE have filters that have electrically charged fibers with diameters greater than one micron. Such filters rely on an electrostatic charge to trap particulates. General cleaning practices used by medical personnel, such as bleach solution spray and autoclaving, destroys the electrostatic charge of the fibers, rendering the filter ineffective. Therefore, common N95 facemasks and respirator filters cannot be washed or otherwise sterilized and, as a result, are single use.

Most PPE filtering relies on four mechanisms to block unwanted particulate articles from passing through the filter: inertial impaction, interception, electrostatic attraction, and diffusion. Inertial impact and interception are the mechanisms which are more effective to filter larger particulate (i.e., on the scale of microns), while electrostatic attraction and diffusion often work effectively on smaller particulate of sizes less than a micrometer. Inertial impact occurs in the scenario that a rapid change in air flow direction separate the particulate from the air stream and the particulates are physically stopped by a filter fiber. Inertial impact works for coarse particulates of sizes more than 0.5 microns. Interception is effective to filter particulate that is smaller than particulates blocked via impaction. The smaller particulates do not have strong enough inertia to travel in a straight line. They follow the air stream and are blocked at the interception of two filtering fibers, or caught between two filtering fibers. Similar to inertial impact, interception is typically effective in filtering particles with sizes between 0.1-0.5 microns. Diffusion filtering occurs when a particle exhibits Brownian motion in air, resulting in the particle landing on the surface of a filtering fiber. Diffusion is effective in filtering particles with sizes less than 0.1 microns due to the random movements of the particles causing the particulate matter to come into contact with a submicron filter fiber. Electrostatic attraction occurs when the filtering fibers are electrically charged and an electrostatic attraction between the charged filtering fibers and a particle draws the particle towards the charged filtering fiber instead of allowing the particle to pass through the filter. Electrostatic attraction can have filtering efficiencies of greater than 90% and electrostatic attraction is also effective for filtering particles with dimensions less than 0.1 microns. While electrostatic attraction may be beneficial for increased filtering efficiencies of particles smaller than 0.1 microns, it also has drawbacks. For example, electrostatic filter fibers may lose their electric charge and, therefore, be rendered useless for filtering particulate smaller than 0.1 microns. Typical cleaning methods, such as washing or heating of PPE, can remove the electrostatic charge of a filter fiber and therefore, PPE that relies on electrostatic filtering may be single use PPE. The disclosed PPE filters and methods provide a means for fabricating reusable PPE that relies on diffusion filtering, rather than electrostatic filtering, for particulate smaller than 0.1 microns. By relying on diffusion filtering, the PPE filters may be washed or heated to clean the PPE and the PPE may be reused which reduces cost and eliminates any required fabrication time or shipping time required for new PPE. The reusable filter mediums described herein provide a means for reusable PPE that may protect a wearer of the PPE, and may prevent a wearer of the PPE from spreading diseases or particulate from exhalation into the environment. The methods and filters described herein generally rely on electrospinning of the fibers for the filter medium. Typically, polymers that are easily dissolved in common organic and inorganic solvents (such as water, acetone, and alcohol) are used in electrospinning, such as PVP, PEO, and PVDF. These polymers usually have a relatively low melting temperature. Therefore, typical electrospinning materials are not able to be sanitized by heating or alcohol, and are therefore not useful for fabricating reusable filters for PPE. The materials described herein are composite polymers that exhibit melting temperatures above 300° C., allowing sanitization through heating (e.g., in an autoclave or an oven) and chemical treatment (e.g., bleach or alcohol soak), therefore, enabling the reusability of fiber filters fabricated according to the methods currently described.

Figure 2A:
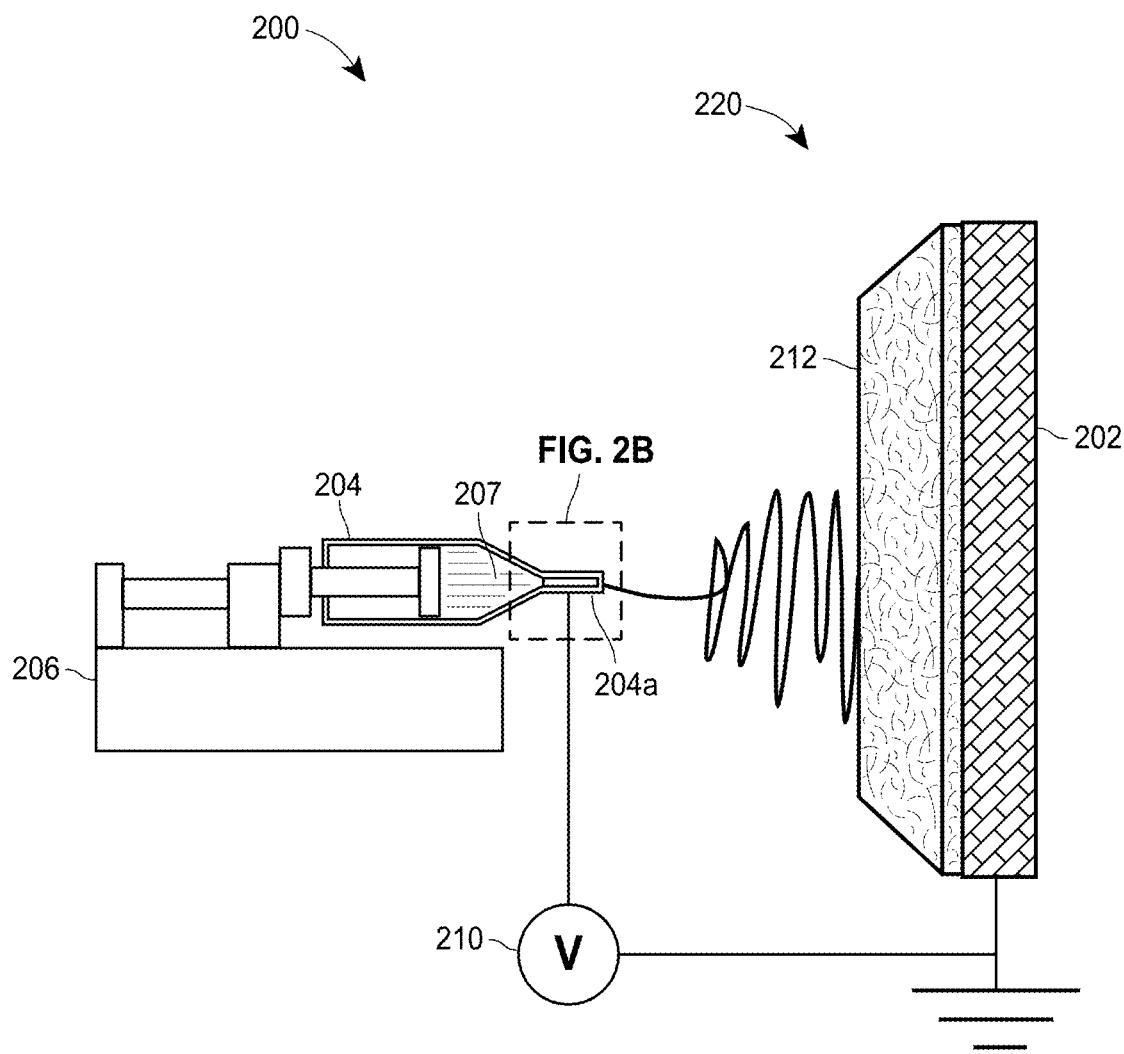
FIG. 2A illustrates an example embodiment of a system for fabricating nanofiber filter mediums for use in PPE.

FIG. 2A is an example embodiment of a system 200 for fabricating a nanofiber filter medium for use in PPE. The system 200 includes a substrate 202, a precursor material chamber 204, and a pump 206 physically coupled to the material chamber 204 and configured to pump precursor material 207 out of the material chamber 204 through a nozzle 204a of the material chamber 204. In embodiments, the material 207 includes a polymer or blend of polymers to form a precursor. Further, the material 207 includes a solvent or a blend of solvents to dissolve polymers and to control the evaporation rate of the precursor material 207. The system 200 further includes a voltage source 210 electrically coupled to the substrate 202 to ground the substrate 202 or to negatively charge the substrate 202, and further configured to provide a positive voltage to the nozzle 204a, or at a region adjacent to the nozzle 204a to create an electric field between the nozzle 204a and the substrate 202. The electric field causes the material 207 that is pumped out of the nozzle 204a to migrate towards the substrate 202 to form an electrospun fiber mat 212 on the substrate 202. In embodiments, the substrate 202 may be a fabric substrate and the resultant electrospun fiber mat 212 on the fabric substrate may be used as a nanofiber filter medium 220 for PPE such as a facemask.

In embodiments, the material chamber 204 may be a syringe and the pump 206 may be a syringe pump physically coupled to the syringe to pump material out of the syringe. In embodiments, the material chamber 204 may be any chamber or vessel for containing a material that is configured to be pumped through the nozzle 204a of the chamber to form nanofibers. In embodiments, the pump may be a mechanical syringe pump, piston pump, diaphragm, plunger, bellows, or a peristaltic pump. In embodiments, the pump may include an actuator configured to push the material 207 through the nozzle 204a of the material chamber 204. In embodiments, the material chamber 204 may be a chamber having one or more constricting walls configured to squeeze the material 207 out of the material chamber 204. In embodiments, the pump 206 may be configured to feed more material 207 into the material chamber 204 to provide a constant feed to the material chamber 204 to force the material 207 out of the nozzle 204a of the material chamber 204.

Figure 2B:
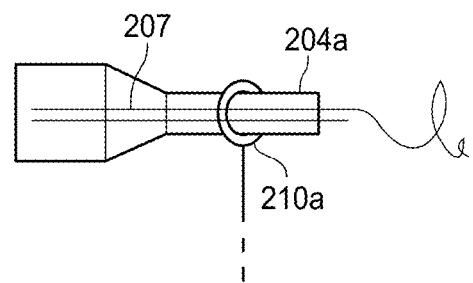
FIG. 2B illustrates an example embodiment of an electrode in a region adjacent to a nozzle to provide a voltage to the nozzle.

In embodiments, the voltage source 210 may be in direct electrical connection with the nozzle 204a to provide a voltage directly to the nozzle 204a. In other embodiments, as illustrated in FIG. 2B, the voltage source 210 may include an electrode 210a in a region that provides the voltage to the nozzle 204a. As shown in FIG. 2B, the electrode 210a may be a conductive plate with a hole in the plate for placing the nozzle 204a through the hole such that the electrode 210a surrounds the nozzle 204a to provide a voltage in a region adjacent to the nozzle 204a. In embodiments, the electrode 210a may be one or more electrical lead wires, a conductive plate, a conductive bar, or another conductive element for providing a voltage directly to, or to a region adjacent to, the nozzle 204a. In embodiments, the electrode 210 may be in direct electrical contact with the nozzle 204a.

Figure 3A:
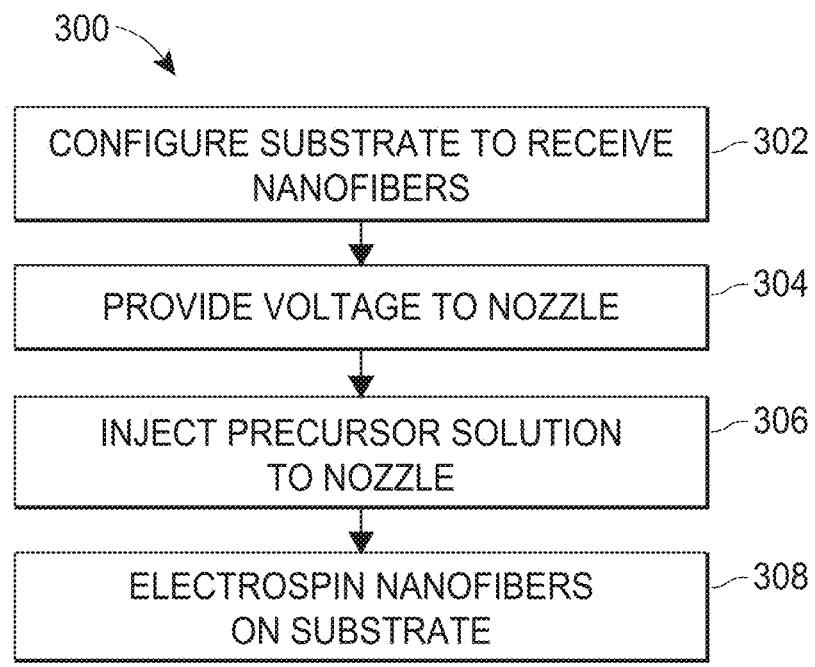
FIG. 3A is a flow diagram of an embodiment of a method for fabricating a reusable nanofiber filter medium for use in PPE.

FIG. 3A is a flow diagram of an embodiment of a method 300 for fabricating a nanofiber filter medium, such as the nanofiber filter medium 220 of FIG. 2A. Further, the method 300 may be performed by the system 200 of FIG. 2A. Referring now simultaneously to FIGS. 2A and 3A, the method 300 includes physically configuring the substrate 202 to receive nanofibers (block 302). The substrate 202 may be a fabric substrate, a thin porous substrate, a plastic substrate, a polymer substrate, a thin film substrate, or another material for use in PPE. The substrate 202 may be placed in an electrospinning system such as the system 200. The substrate 202 may be physically configured to receive the nanofibers from the nozzle 204a. The voltage source 210 then provides a voltage to a region around, or directly to, the nozzle 204a to create a voltage gradient between the nozzle 204a and the substrate 202 (block 304). The method 300 further includes electrospinning nanofibers onto the substrate 202. The precursor material 207 is then injected into the nozzle 204a (block 306). The pump 206 pumps the material 207 out of the material chamber 204 through the nozzle 204a to electrospin the nanofibers onto the substrate 202 (block 308). The material 207 migrates toward the substrate 202, due to the voltage gradient, and forms nanofibers in the form of the nanofiber mat 212 on the substrate 202. In embodiments, the voltage source 210 may provide a voltage of 1 to 10 kV, 10 to 20 kV, or 20 to 50 kV, to the nozzle 204a or to a region around the nozzle 204a. In embodiments, the substrate is in an ambient room temperature and ambient room pressure environment.

In embodiments, the material 207 may be a polymer, and the nanofiber mat 212 may include a layer of polymer nanofibers. In embodiments, the material may include one or more of polypropylene, polyacrylonitrile, polyimide, polybenzimidazole, polyethylene terephthalate, poly(m-phenylene isophthalamide), and poly(vinylidene fluoride-co-hexafluoropropylene). In embodiments, the material 207 may be a polymer composite or hybrid polymer material composed of multiple polymers. As described further herein, a composite polymer may be employed to fabricate fibers that are both resilient to heating, and resilient to chemicals. In embodiments, the nanofibers may be a material that is structurally stable at temperatures up to 300° C. (i.e., the molecular structure of the nanofibers is not altered at temperatures of 300° C. or less). The material 207 may include a material that is chemically resistant to acids, bases, and/or commonly used organic solvents and additionally the material 207 may further include a material that is thermally resilient (i.e., molecularly stable at temperatures greater than 200° C.). By combining chemically resistant and thermally resistant materials to fabricate the nanofibers, the resultant nanofiber mat 212 may be disinfected through both chemical means and thermal means resulting in a reusable filter medium. The composite polymer may contain two polymers or more than two polymers. Some preferred combinations of two polymers include the combination of polyacrylonitrile and polyimide, of polyacrylonitrile and polybenzimidazole, of polyacrylonitrile and poly(m-phenylene isophthalamide), or of polypropylene and polyimide. Three polymer combinations include, without limitation, polyacrylonitrile, polybenzimidazole, and polyimide or polyacrylonitrile, poly(m-phenylene isophthalamide), and polyimide. The composition of the composite polymer can be in any range between 1:99 and 50:50 in term of the amount of two material polymers.

In embodiments, the nanofiber mat 212 may include nanofibers having diameters of 10 to 50 nanometers, 20 to 100 nanometers, 100 to 500 nanometers, less than 500 nanometers, 200 nanometers to 1 micron, 300 to 1600 nanometers, 500 to 2000 nanometers, greater than 500 nanometers, or less than 2 microns. In embodiments, the diameter of the nanofibers may be determined by the material 207, and the fiber diameters may be tuned by using a plurality of polymers, various solvents, different concentrations of polymers, or different molecular weight of polymers as the material 207. Further, the diameter of the nanofibers may be tuned by electrospinning conditions such as voltage, working distance, substrate rotation, and temperature. The nanofibers may have a diameter that filters particulate by diffusion filtering at an efficiency of greater than 80%, greater than 90%, or 95% or greater. In embodiments, the nanofiber mat 212 may include nanofibers having a plurality of diameter thicknesses and/or materials to form a heterogeneous multi-diameter fiber layer. In embodiments, the nanofiber mat 212 may include a plurality of homogenous single diameter fiber sublayers. For example, a first sublayer of the nanofiber mat 212 may include nanofibers having diameters of 300±20 nanometers, and a second sublayer of the nanofiber mat 212 may include nanofibers having diameters between 1000±100 nanometers. In embodiments, the nanofiber mat 212 may have more than two homogenous single diameter fiber layers as is desired or required to effectively filter particulate for reusable PPE.

In embodiments, the method 300 may further include providing an anti-pathogen agent to the nanofibers. The anti-pathogen agent may be applied to the nanofibers after the formation of the nanofiber mat 212, such as by spraying the nanofiber mat 212 with the anti-pathogen agent or submerging the nanofiber mat 212 in a solution to apply the anti-pathogen agent or coating the anti-pathogen to the surface of nanofiber mat 212 by physical or chemical vapor deposition. In embodiments, the anti-pathogen agent may be included in the material 207 that is used to form the nanofibers through electrospinning, and therefore, the anti-pathogen agent becomes a component of the molecular structure of the nanofibers. For example, an anti-pathogen may be included in the material chamber 204 in a solution with a polymer for forming nanofibers. The anti-pathogen may include an anti-bacterial agent such as 4,5-dichloro-2-n-octyl-4-isothiazolin-3-one or 5-chloro-2-(2,4-dichloro-phenoxy)phenol that may be sprayed onto, or otherwise deposited onto the nanofibers. The anti-bacterial may also be included in the materials chamber 204 and incorporated in the structure of the nanofibers during electrospinning. In embodiments, the anti-pathogen may be an anti-bacterial particle, such as silver particles which are included in the material chamber 204 and incorporated in the structure of the nanofibers during electrospinning. Further, the anti-pathogen agent may include an anti-viral agent. For example, copper particles may be included in the material chamber 204 and the anti-viral copper particles may be incorporated into the structure of the nanofibers during electrospinning of the nanofiber mat 212. Other anti-pathogen agents include CuAg nanoparticles, CuZn nanoparticles, CuOx nanoparticles, CuZnFeOx nanoparticles, CuZnOx nanoparticles, other Cu-based nanoparticles such as CuAl nanoparticles, and copper compounds such as copper (II) acetylacetonate. The anti-pathogen agents may also have non-spherical shape such as nanorods, nanorods, and nanoflakes.

In embodiments, the substrate 202 may include previously fabricated PPE or partially fabricated items. For example, the substrate 202 may be a fully fabricated, or partially fabricated, N95 mask, and nanofibers may be electrospun onto a surface or a sublayer of the N95 mask (e.g., the spunbond layer, the meltblown layer, or spunbond-meltblown-spunbond fabrics). Further, the substrate may include cloth to be used as a medical gown for a doctor or patient, or cloth for another article to be worn by a person. The substrate may be a cloth bed sheet, or cloth to be fabricated into a bed sheet for use on a patient's bed or for home use. Further, the substrate may include any cloth for use as a shirt, pants, glove, facemask, air filter, fluid filter, or any cloth, latex, flexible plastic, wool, fur, textile, or other material for use in filtering of particulate. In embodiments, any of the described substrates 202 may include an anti-pathogen agent as described herein.

Figure 3B:
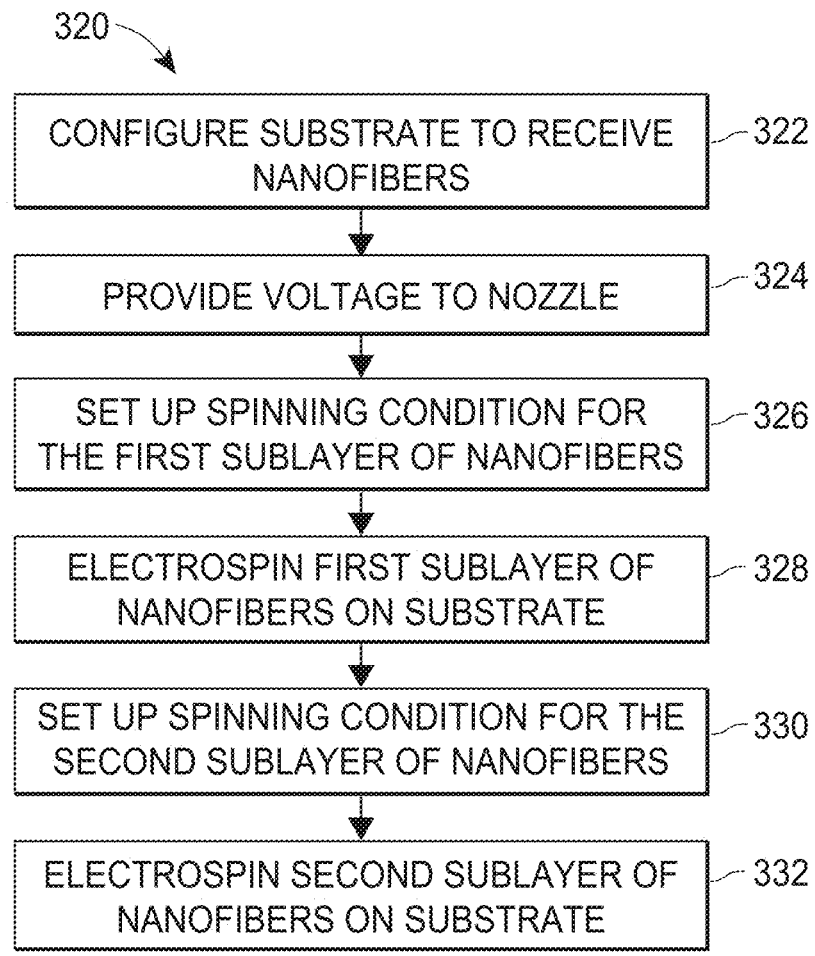
FIG. 3B is a flow diagram of an embodiment of a method for fabricating a reusable nanofiber filter medium having a plurality of fiber sublayers for use in PPE.

FIG. 3B is a flow diagram of an embodiment of a method 320 for fabricating a nanofiber filter medium, such as the nanofiber filter medium 220 of FIG. 2A, having a plurality of nanofiber sublayers. Further, the method 320 may be performed by the system 200 of FIG. 2A. Referring now simultaneously to FIGS. 2A and 3B, the method 320 includes configuring the substrate 202 to receive nanofibers thereon (block 322). The substrate 202 may be placed in an electrospinning system such as the system 200 to receive nanofibers from the nozzle 204a. The voltage source 210 provides a voltage to a region around, or directly to, the nozzle 204a to create a voltage gradient between the region around the nozzle 204a, and the substrate 202 (block 324).

The method 320 further includes setting up spinning conditions for a first sublayer of nanofibers (block 326). The spinning conditions may include a speed of rotation of the substrate, a voltage level, a pump speed of the material 207, a bias voltage applied to the substrate 202, the shape and size of nozzle 204a, the shape and size of substrate 202, temperature of the nozzle 204a and the substrate 202, humidity level (e.g., controlled by flowing dry air or N2 gas), and the rheological property of precursor material 207 (e.g., viscosity, viscoelasticity, surface tension, conductivity, evaporation rate). The method then includes electrospinning a first nanofiber sublayer on to the substrate 202 (block 328). The first nanofiber sublayer may include nanofibers having diameter widths of 10 to 50 nanometers, 20 to 100 nanometers, 100 to 500 nanometers, 200 nanometers to 1 micron, 300 to 1600 nanometers, 500 to 2000 nanometers, greater than 500 nanometers, less than 200 nanometers, less than 500 nanometers, less than 1 micron, or less than 2 microns. In embodiments, the first nanofiber sublayer may have a thickness of 100 to 250 nanometers, 200 to 500 nanometers, 400 to 800 nanometers, 750 nanometers to 1 micron, 1 to 10 microns, 10 to 20 microns, 5 to 20 microns, 20 to 70 microns, 50 to 100 microns, or between 100 to 200 microns.

The method 320 includes setting up spinning conditions for the second sublayer of nanofibers (block 330). The spinning conditions of the second sublayer of nanofibers may include a speed of rotation of the substrate, a voltage level, a pump speed of the material 207, a bias voltage applied to the substrate 202, the shape and size of nozzle 204a, the shape and size of substrate 202, temperature of the nozzle 204a and the substrate 202, humidity level (e.g., controlled by flowing dry air or N2 gas), and the rheological property of precursor material 207 (e.g., viscosity, viscoelasticity, surface tension, conductivity, evaporation rate). The method further includes electrospinning a second nanofiber sublayer on to the substrate 202 (block 332). The second nanofiber sublayer may include nanofibers having diameter widths of 10 to 50 nanometers, 20 to 100 nanometers, 100 to 500 nanometers, 200 nanometers to 1 micron, 300 to 1600 nanometers, 500 to 2000 nanometers, greater than 500 nanometers, less than 200 nanometers, less than 500 nanometers, less than 1 micron, or less than 2 microns. In embodiments, the second nanofiber sublayer may have a thickness of 100 to 250 nanometers, 200 to 500 nanometers, 400 to 800 nanometers, 750 nanometers to 1 micron, 1 to 10 microns, 10 to 20 microns, 5 to 20 microns, 20 to 70 microns, 50 to 100 microns, or between 100 to 200 microns.

In embodiments, the nanofiber mat 212 may have a thickness of between 500 nanometers and 1 micron, 1 and 5 microns, 5 and 20 microns, between 20 and 70 microns, between 50 and 100 microns, less than 100 microns, or greater than 100 microns. In embodiments having a plurality of nanofiber sublayers, each of the nanofiber sublayers of the plurality of nanofiber sublayers may have a thickness of between 5 and 20 microns, between 20 and 70 microns, between 50 and 100 microns, less than 100 microns, or greater than 100 microns. In embodiments, each of the sublayers may have a same thickness, or each of the sublayers may have different thicknesses. Additionally, each sublayer of the plurality of nanofiber sublayers may have a same thickness or each sublayer may have a different thickness. In embodiments, the first sublayer may include nanofibers having smaller diameters than the second sublayer, or the first sublayer may include nanofibers having greater diameters than the second sublayer. In embodiments, the first sublayer may include nanofibers having a range of diameters that overlaps with a range of nanofiber diameters of the second sublayer to create a nanofiber diameter gradient throughout the nanofiber mat 212. For example, the first sublayer may include nanofibers having diameters from 50 and 200 nanometers, and the second sublayer may include nanofibers having diameters from 125 to 400 nanometers to create a gradient filtration system through the nanofiber mat 212. Although described herein as having two sublayers, the nanofiber mat may have more than two sublayers with each sublayer having nanofibers with any diameters or ranges of diameters described herein, and with each sublayer having a same or different thicknesses described herein. Alternatively, in embodiments, the nanofiber mat 212 may include a single layer of nanofibers that have a variety of diameters between 50 nanometers and 2 microns.

Face velocity is the velocity of the flow of air transmitted through the facemask. For example, the face velocity or air when a person is breathing normally into a facemask is less than the face velocity of air when a person coughs into the facemask PPE. In embodiments, the material of the nanofibers, the diameter of the nanofibers, the number of nanofiber layers, and the thickness of the one or more nanofiber layers of the nanofiber mat 212 may be configured to fabricate a reusable filtration element having a filtering efficiency of greater than 60%, greater than 70%, greater than 80%, or greater than 90% at a face velocity of between 8 and 14 cm/s, between 10 and 20 cm/s, between 12 and 20 cm/s, greater than 5 cm/s, greater than 10 cm/s, greater than 12 cm/s, or greater than 14 cm/s. In embodiments, the filtering efficiency of the reusable filtration element may depend on the face velocity of the air flowing into the filtration element. The pressure drop across a facemask for PPE is a means for measuring the change in the airflow due to airflow resistance of the facemask filter. Higher pressure drop values may cause wearers of the PPE to experience more difficulty when breathing. In embodiments, the material of the nanofibers, the diameter of the nanofibers, the number of nanofiber layers, and the thickness of the one or more nanofiber layers of the nanofiber mat 212 may be configured to fabricate a reusable filtration element having a pressure drop of between 40 and 50 mmH$_2$O, between 30 and 45 mmH$_2$O, between 15 and 20 mmH$_2$O, between 5 and 20 mmH$_2$O, less than 45 mmH$_2$O, or less than 25 mmH$_2$O.

Figure 4A:
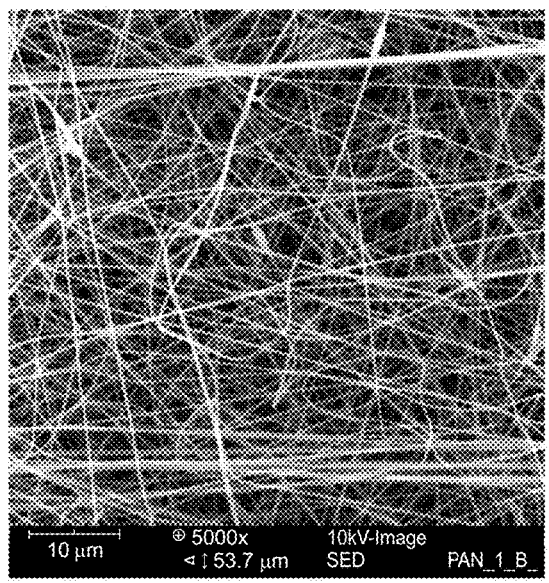
FIG. 4A is an SEM image of electrospun nanofibers with submicron diameters.
Figure 4B:
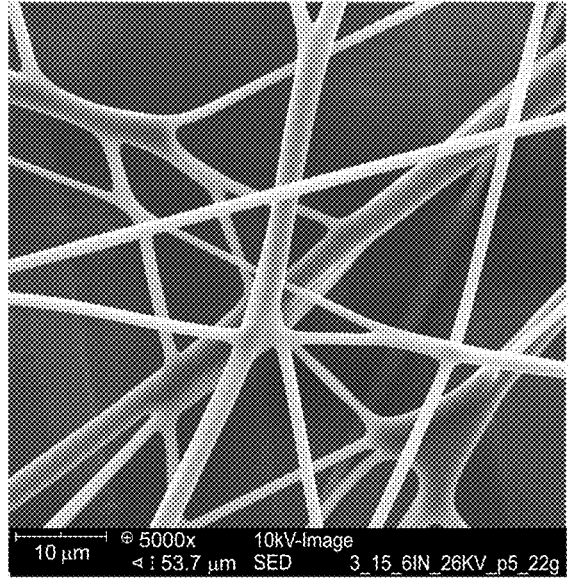
FIG. 4B is an SEM image of electrospun fibers with diameters on the order of microns.
Figure 4C:
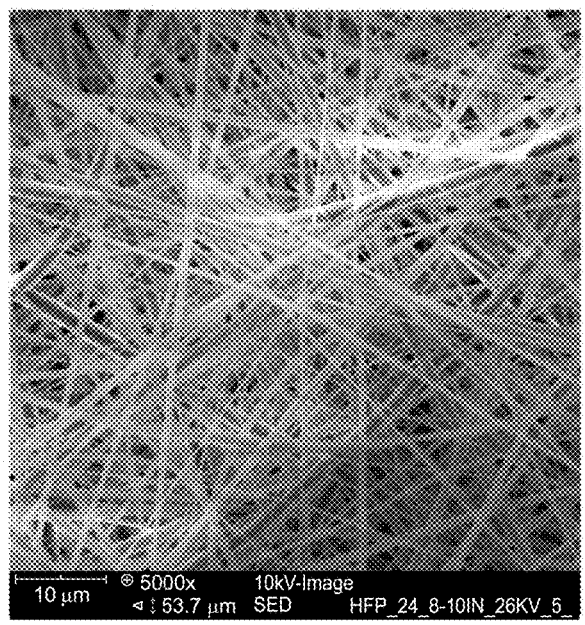
FIG. 4C is an SEM image of a matrix of electrospun fibers having fibers with diameters less than a micron, and fibers having diameters on the order of microns.

FIGS. 4A-4C are SEM images of electrospun fibers of a nanofiber mat, such as the nanofiber mat 212 of FIG. 2. The nanofibers of FIGS. 4A-4B are 7:3 polyacrylonitrile:polybenzimidazole nanofibers and the nanofibers of FIG. 4C are poly(vinylidene fluoride-co-hexafluoropropylene. Each of the images of FIGS. 4A-4C are at the same magnification and the same scale. The nanofibers of FIG. 4A have diameters of on the order of hundreds of nanometers (e.g., 200 nanometers to 700 nanometers), which are referred to herein as "thin" nanofibers. The fibers of FIG. 4B have diameters of greater than 700 nanometers, referred to herein as "coarse" nanofibers. In embodiments, a layer of thin nanofibers may increase the effectiveness of diffusive filtering of particulate compared to coarse nanofibers. FIG. 4C illustrates a layer of a nanofiber matrix of a nanofiber mat having both thin and coarse nanofibers. Due to the different diameters of the thin and coarse fibers, the nanofiber mat of FIG. 4C may be beneficial for increasing the efficiency of impact filtering, interception filtering, and diffusive filtering for a reusable facemask filtering medium. In embodiments, a reusable filter medium may employ independent layers of thin and coarse nanofibers, or, as illustrated in FIG. 4C, a reusable filter medium may include a single layer of intertwined thin and coarse nanofibers.

Figure 5:
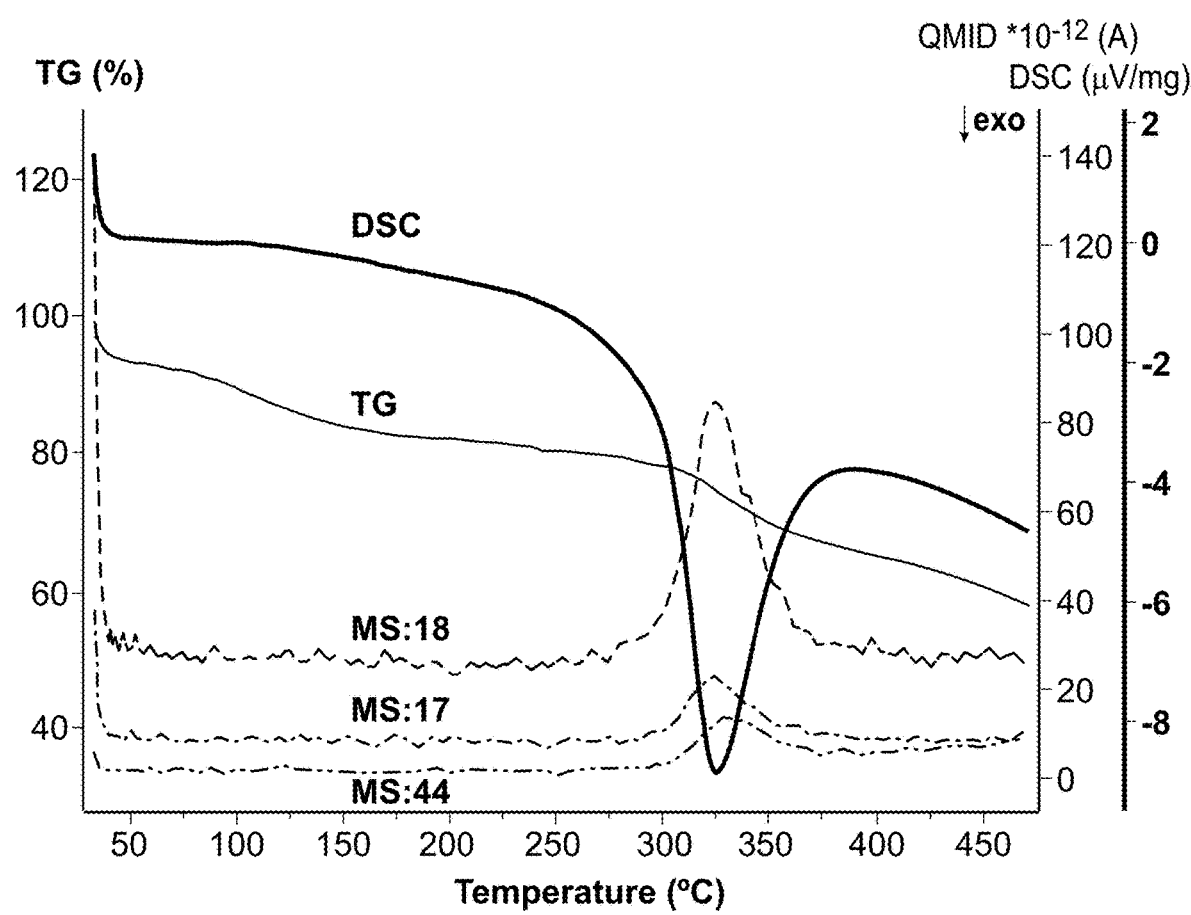
FIG. 5 is a plot of thermogravimetric analysis—mass spectrometry (TGA-MS) versus temperature for polymer electrospun nanofibers demonstrating thermal stability at temperatures below 300° C., a differential scanning calorimetry (DSC) curve.

As previously discussed, one method for sanitizing PPE is by heating the PPE within a highly moisturized environment, such as by autoclaving, at a temperature of 110° C. with supersaturation steams for between 5 and 15 minutes, between 10 and 20 minutes, between 15 and 30 minutes, between 20 and 40 minutes, or for greater than 30 minutes. Some viruses require an even higher treatment temperature to kill and therefore, it may be required that the molecular structure of a nanofiber filter for PPE be structurally stable at temperatures of up to 200° C., 250° C., or 300° C. In embodiments, the molecular structure of a nanofiber filter may be structurally stable above temperatures of 300° C. for use in PPE or on a substrate that experiences very high temperatures (i.e., greater than 300° C.). FIG. 5 is a plot of thermogravimetric analysis—mass spectrometry (TGA-MS) versus temperature. The local maximums and minimums of the curves of FIG. 5 indicate that no significant structural changes occur to the nanofibers at temperature below approximately 300° C. The bold solid curve is differential scanning calorimetry (DSC) curve and the thin solid curve is TGA data. The dotted lines are MS curves corresponding to molecular mass 17 (NH3), 18 (H2O), and 44 (CO2). An exothermic peak in the DSC data indicates a chemical reaction or physical change occurred to the sample that releases heat. An endothermic peak in the DSC data, as shown in FIG. 5, indicates a chemical reaction or physical change occurred to the sample that absorbs heat. A peak in MS data indicates generation of a chemical species as a product of a chemical reaction or physical change to the sample. For example, the three dotted curves in the MS data correspond to the formation of NH3, H2O, and CO2.

Figure 6A:
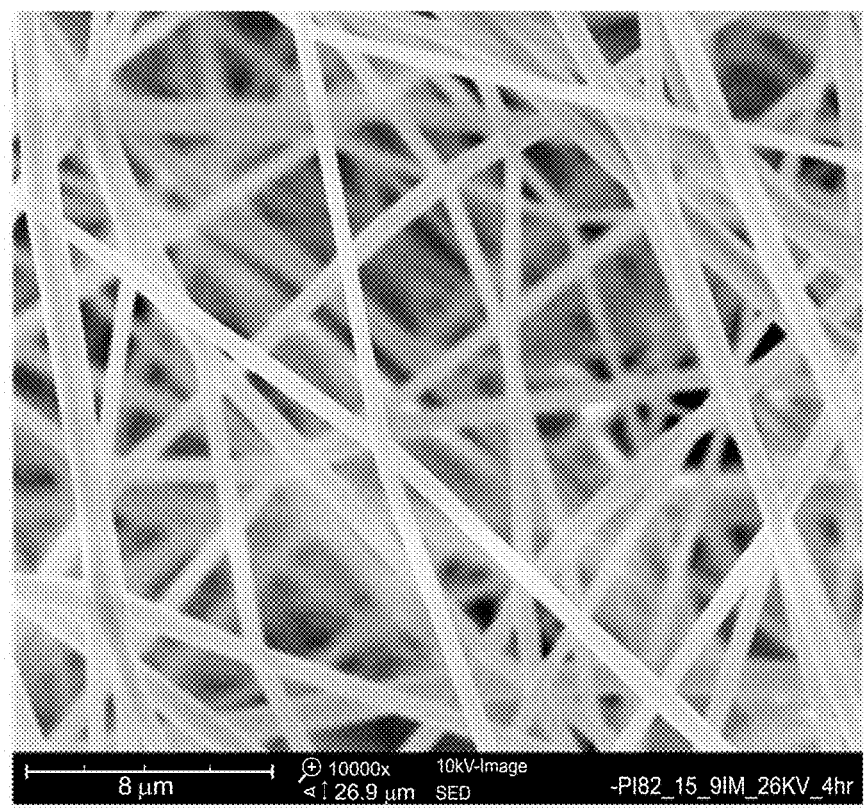
FIG. 6A is an SEM image of a control sample that was cut from an as-grown electrospun nanofiber sample.
Figure 6B:
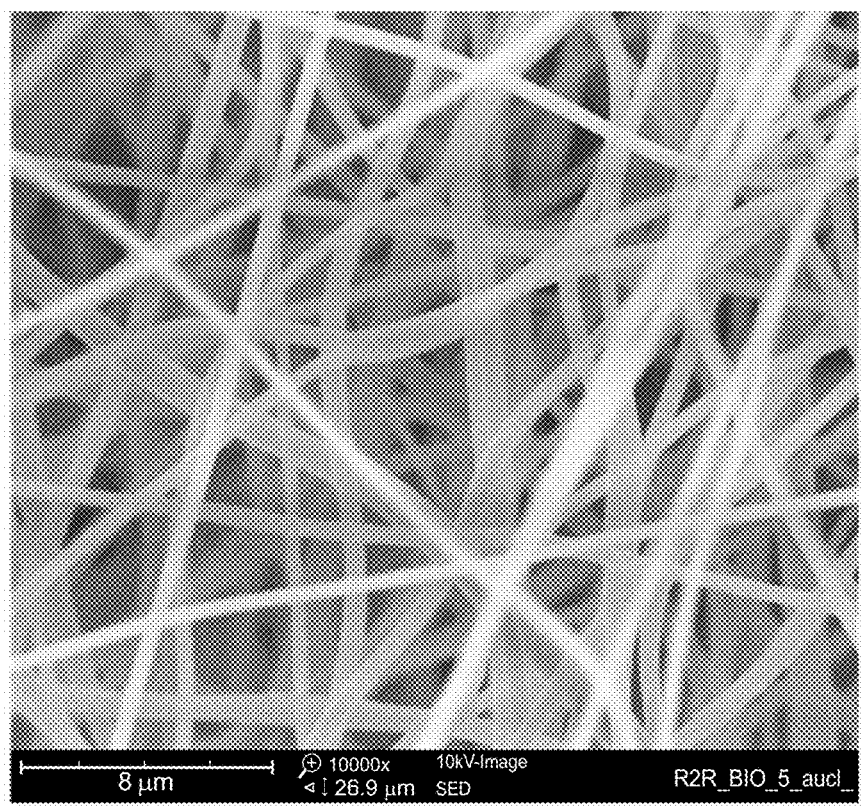
FIG. 6B is an SEM image of the electrospun nanofibers that were disinfected by autoclaving, with the nanofibers being cut from the same sample as the sample of FIG. 6A.

FIGS. 6A and 6B are SEM images of a nanofiber matrix of a 7:3 polyacrylonitrile:polybenzimidazole nanofiber mat, such as the nanofiber mat 212 of FIG. 2A, for use as a filtering medium in PPE. FIG. 6A shows the nanofibers cut from an as-spun nanofiber mat, while FIG. 6B is an SEM image of the nanofibers of the nanofiber mat that has been sanitized. To sanitize the nanofiber mat, the nanofiber mat was autoclaved at a temperature of 110° C. in supersaturated steam. The nanofibers of FIG. 6B display no significant structural differences as compared to the nanofibers of FIG. 6A. No breaks or structural damage to the nanofibers is observed, and no notable change in the nanofiber matrix is observed in the sanitized nanofiber mat. Therefore, the nanofibers fabricated according to the methods disclosed are structurally resilient to sanitation by autoclaving.

Figure 7B:
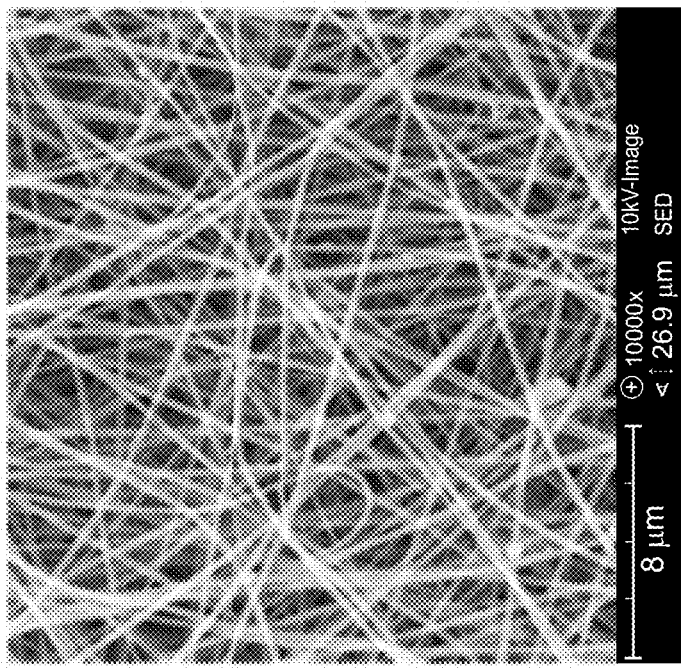
FIG. 7B is an SEM image of an electrospun nanofiber sample that was disinfected by submersion of the nanofiber sample in boiling water, with the nanofibers being cut from the same sample as the sample of FIG. 7A.
Figure 7A:
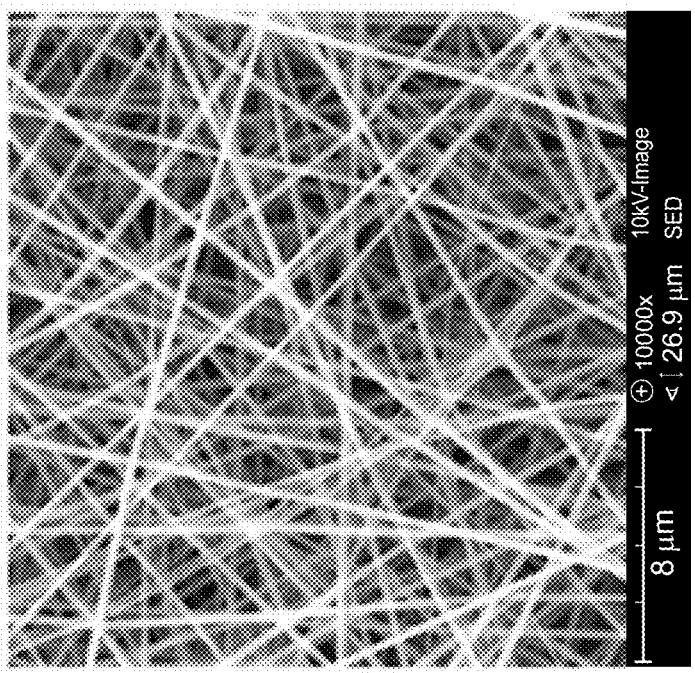
FIG. 7A is an SEM image of a control sample that was cut from an as-grown electrospun nanofiber sample.

FIGS. 7A and 7B are SEM images of a nanofiber matrix of a 7:3 polyacrylonitrile:polybenzimidazole nanofiber mat for use as a filtering medium in PPE. FIG. 7A shows the nanofibers cut from an as-spun nanofiber mat, while FIG. 7B is an SEM image of the nanofibers of the nanofiber mat after the nanofiber mat was sanitized by submerging the nanofiber mat in boiling water. The nanofibers of FIG. 7B display no significant structural differences as compared to the nanofibers of FIG. 7A. No breaks or structural damage to the nanofibers is observed, and no notable change in the nanofiber matrix is observed in the sanitized nanofiber mat. Therefore, the nanofibers fabricated according to the methods disclosed are structurally resilient to sanitation by submerging the nanofibers in boiling water.

Figure 8:
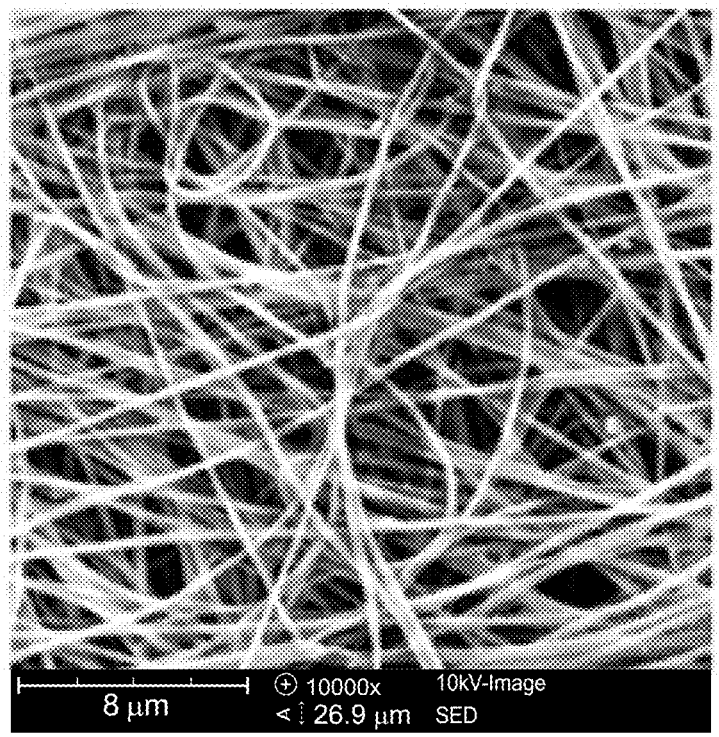
FIG. 8 is an SEM image of an electrospun nanofiber sample by submersion of the nanofiber sample in soapy water, with the nanofibers being cut from the same sample as in FIG. 7A.

FIG. 8 is a SEM image of a 7:3 polyacrylonitrile:polybenzimidazole nanofiber matrix cut from the same piece of as-spun fiber mat as in FIG. 7A but was sanitized by submerging the nanofiber mat in soapy water. The nanofibers of FIG. 8 display no significant structural differences as compared to the nanofibers of FIG. 7A, which demonstrates that the nanofibers are structurally resilient to sanitation by submerging the nanofibers in soapy water.

Figure 9A:
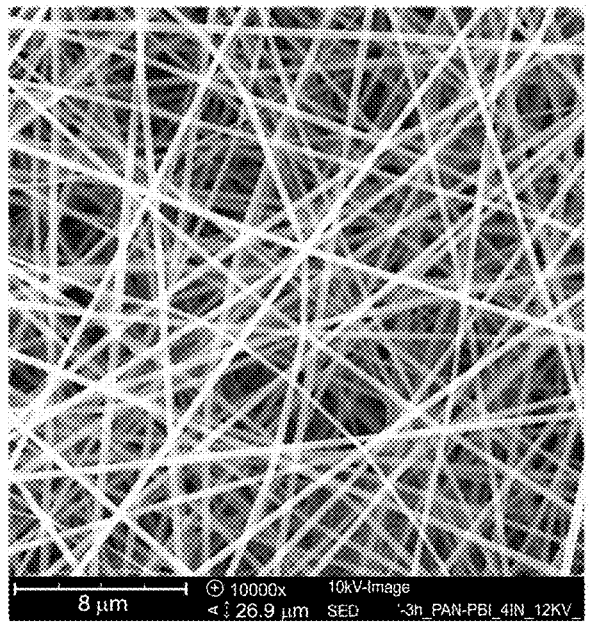
FIG. 9A is an SEM image of a control sample that was cut from an as-grown electrospun nanofiber sample.
Figure 9B:
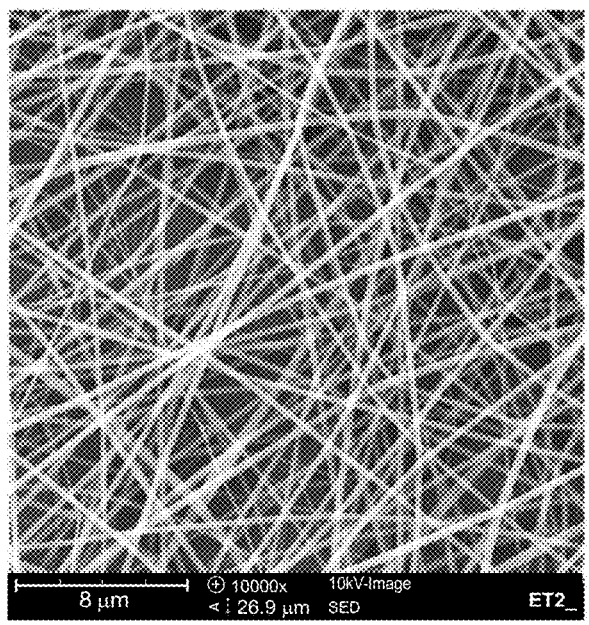
FIG. 9B is an SEM image of an electrospun nanofiber sample that was disinfected by exposure of the nanofibers to pure alcohol (ethanol) for 15 minutes, with the nanofibers being cut from the same sample as in FIG. 9A.
Figure 9C:
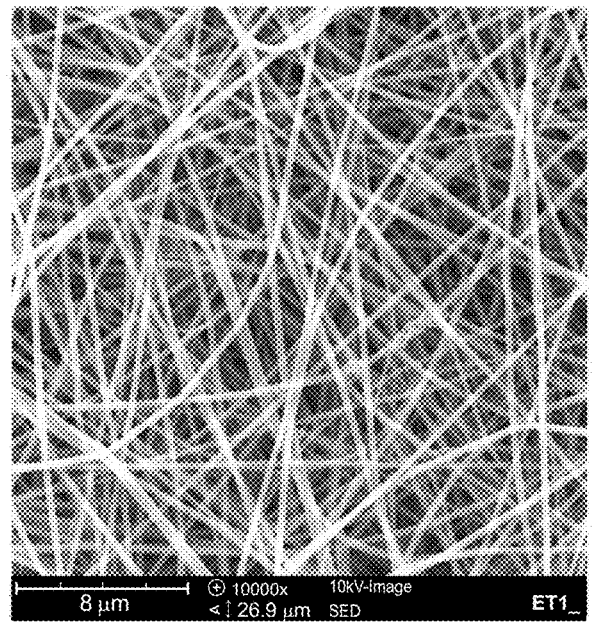
FIG. 9C is an SEM image of an electrospun nanofiber sample that was disinfected by exposure of the nanofibers to pure alcohol (ethanol) for 3 days, with the nanofibers being cut from the same sample as in FIG. 9A.

FIGS. 9A-9C are SEM images of a 7:3 polyacrylonitrile: polybenzimidazole nanofiber matrix of a nanofiber mat for use as a filter medium in PPE. FIG. 9A shows a control group of nanofibers that are cut from an as-spun fiber mat that are not exposed to any form of decontamination, and FIGS. 9B and 9C show nanofibers cut from the same piece of fiber mat as in FIG. 9A with the fibers of FIGS. 9B and 9C having been decontaminated by submerging the nanofiber matrix in 70:30 Ethathon for 15 minutes and three days, respectively. The nanofibers of FIGS. 9B and 9C display no significant structural differences as compared to the nanofibers of FIG. 9A. No breaks or structural damage to the nanofibers is observed, and no notable change in the nanofiber matrix is observed in the sanitized nanofiber mat. Therefore, as illustrated by FIGS. 9A-9C, the nanofibers and fabrication techniques described herein enable sanitization by chemical decontamination of nanofiber filter mediums for reusable PPE.

Figure 10A:
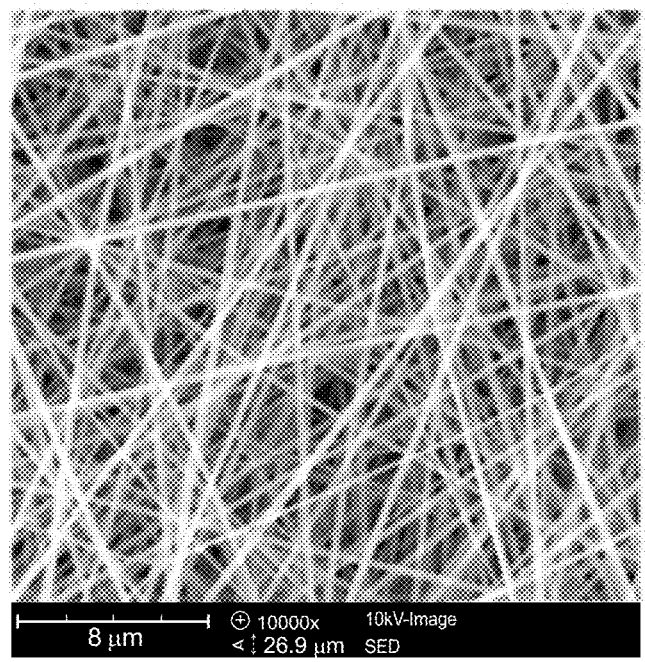
FIG. 10A is an SEM image of an electrospun nanofiber sample that was disinfected by heating the nanofibers to 70° C., with the nanofibers being cut from the same sample as in FIG. 9A.
Figure 10B:
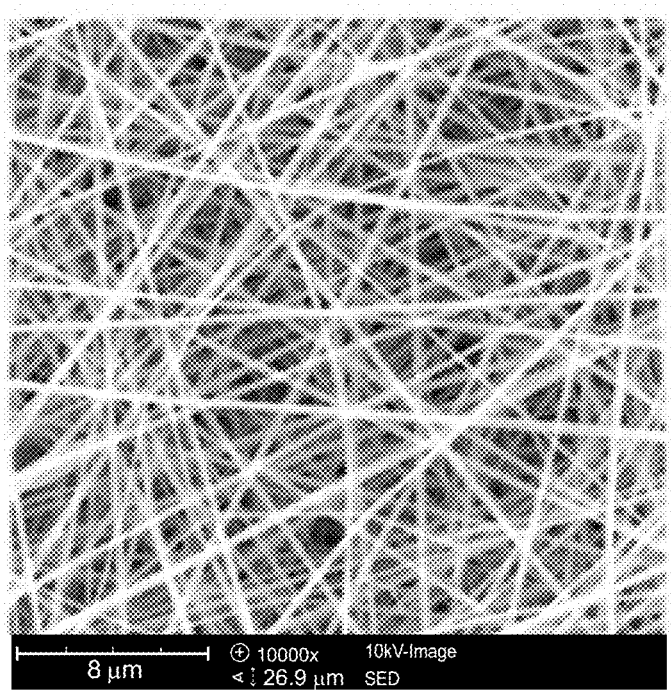
FIG. 10B is an SEM image of an electrospun nanofiber sample that was disinfected by heating the nanofibers to 180° C., with the nanofibers being cut from the same sample as in FIG. 9A.

Sanitization by oven heating was also performed. FIGS. 10A-10B are SEM images of nanofiber matrix cut from the same piece of fiber mat in FIG. 9A but with the nanofibers of FIGS. 10A and 10B being decontaminated by heating the nanofiber matrix in an oven to 70° C. and 180° C., respectively. The nanofibers of FIGS. 10A and 10B display no significant structural differences as compared to the nanofibers of FIG. 9A. Therefore, as illustrated by FIGS. 10A-10B, the nanofibers and fabrication techniques described herein enable sanitization by oven heating of nanofiber filter mediums for reusable PPE.

Figure 11A:
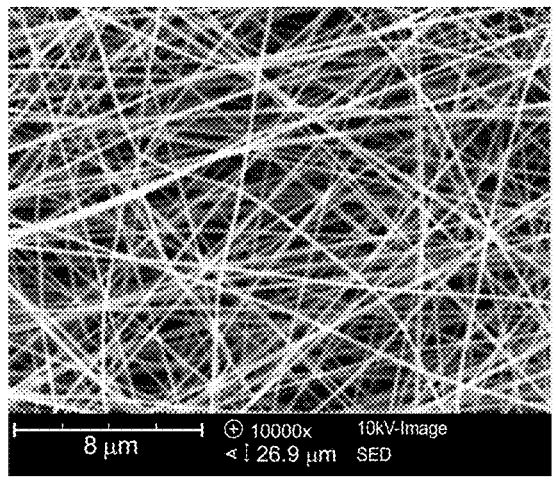
FIG. 11A is an SEM image of a control sample that was cut from an as-grown electrospun nanofiber sample.
Figure 11B:
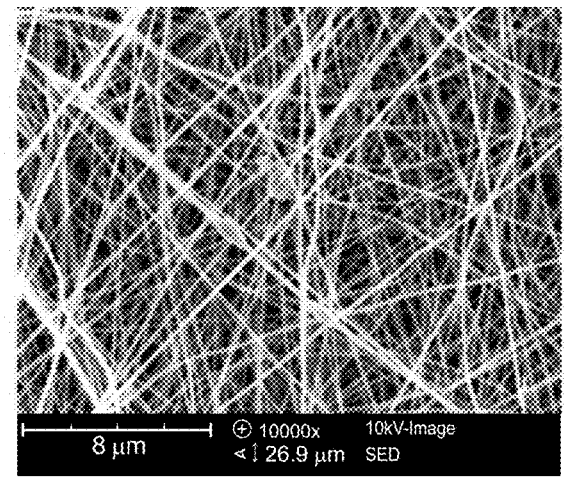
FIG. 11B is an SEM image of an electrospun nanofiber sample that was cut from the same piece of sample as in FIG. 11A but was disinfected by submerging the nanofibers in a 5 wt % bleach water solution.
Figure 11C:
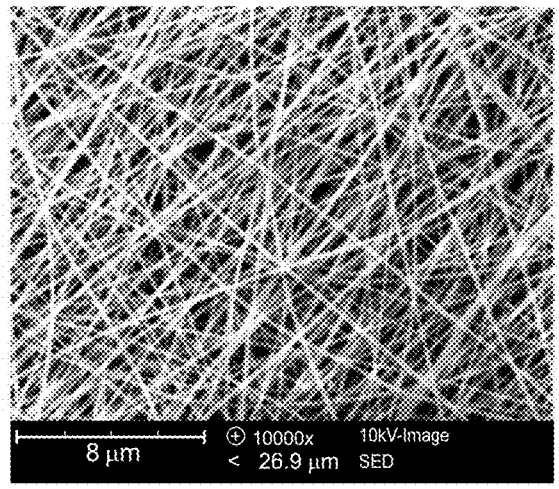
FIG. 11C is an SEM image of an electrospun nanofiber sample that was cut from the same piece of sample as in FIG. 11A but was disinfected by submerging the nanofibers in a 7.5 wt % bleach water solution.
Figure 11D:
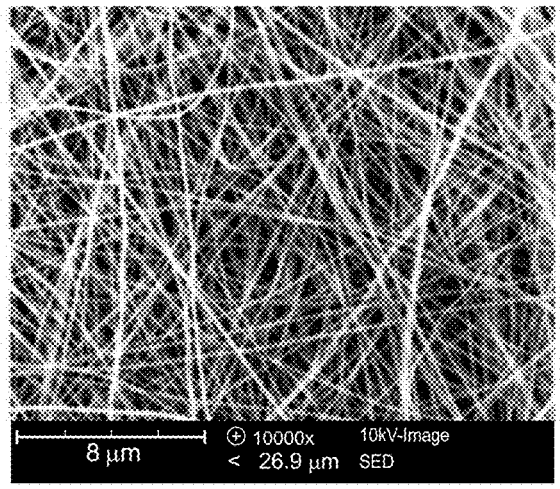
FIG. 11D is an SEM image of a group of an electrospun nanofiber sample that was cut from the same piece of sample as in FIG. 11A but was disinfected by submerging the nanofibers in a 10 wt % bleach water solution.

A further sanitization by submerging a nanofiber matrix in a bleach solution was performed. FIG. 11A is an SEM image of a control group of nanofibers that are cut from an as-spun fiber mat that is not exposed to any bleach or chemical sanitization. FIGS. 11B, 11C, and 11D are SEM images of 7:3 polyacrylonitrile:polybenzimidazole nanofibers cut from the same piece of fiber mat as the one in FIG. 11A, with the nanofibers of FIGS. 11B-11D being decontaminated by submerging the nanofiber mat in a bleach solution having 5 wt % bleach, 7.5 wt % bleach, and 10 wt % bleach respectively. The nanofibers of FIGS. 11B through 11D display no significant structural differences as compared to the nanofibers of FIG. 11A. Therefore, as illustrated by FIGS. 11A-11C, the nanofibers and fabrication techniques described herein enable sanitization of a nanofiber mat by submersion of the nanofiber mat in a bleach solution.

Figure 12A:
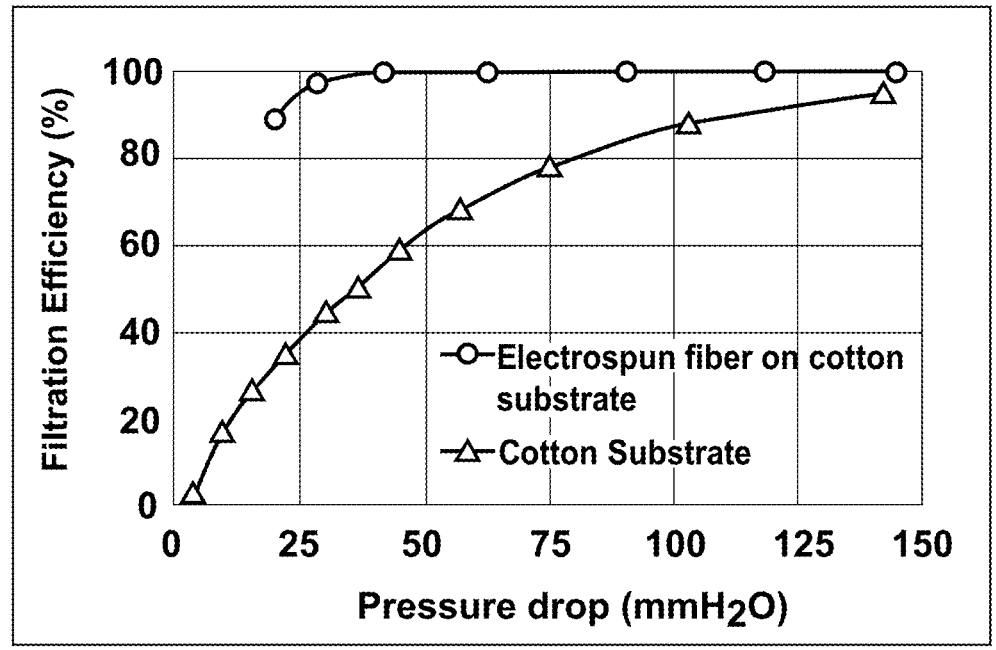
FIG. 12A is a plot of filtration efficiency versus pressure drop for electrospun nanofibers deposited on a cotton substrate measured by a salt loading test at a face velocity of 14 cm/s.

The National Institute for Occupational Safety and Health (NIOSH) requires that a facemask for filtering particulate have a 95% filtering efficiency (i.e., an N95 facemask certification) at a 25 mmH$_2$O pressure drop across the mask. FIG. 12A is a plot of filter media filtration efficiencies versus air pressure drop for an electrospun media deposited on a cotton cloth and the filtration performance of a pure cotton substrate. The filtration data of FIG. 12A was measured by a salt loading test at a face velocity of 14 cm/s. The mass mean size of the NaCl particles was 0.26 µm. A filtration efficiency of 90% was observed for the cloth having the electrospun media at an air pressure drop of ~20 mmH$_2$O. The cotton substrate itself showed a filtration efficiency of ~4% at low pressure drop values, which indicates that the cotton substrate does not filter any particulate. The filtration performance of the filter media sample is due to the electrospun fibers. Another electrospun media that is slightly thicker than the media shown in FIG. 12A was tested and showed a filtration efficiency of 97% at a face velocity of 23 cm/s, which meets the NIOSH requirements.

Figure 12B:
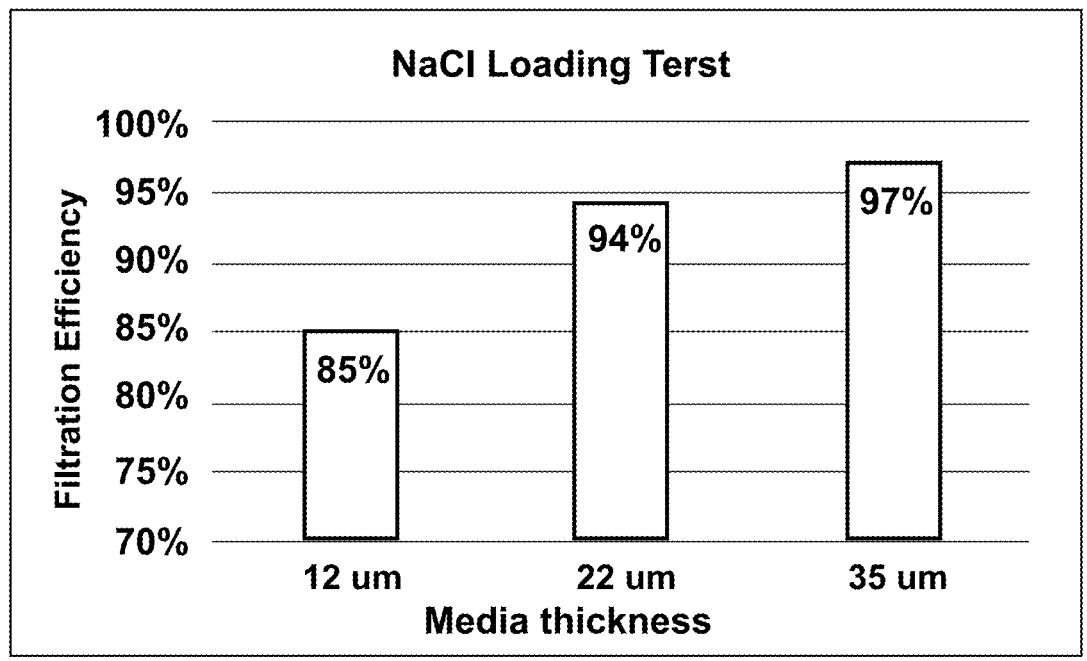
FIG. 12B shows filtration efficiency of electrospun filter media with different thicknesses (e.g., 12 microns, 22 microns, and 35 microns) measured by a salt loading test at 23 cm/s face velocity.

FIG. 12B shows filtration efficiencies of filter media with different thicknesses (e.g., 12 microns, 22 microns, and 35 microns). The thickness was measured by cross-sectional SEM imaging. The 35 micron thick media exhibited a filtration efficiency of 97%, and the data of FIG. 12B shows the thicker media having higher the filtration efficiencies.

Figure 12C:
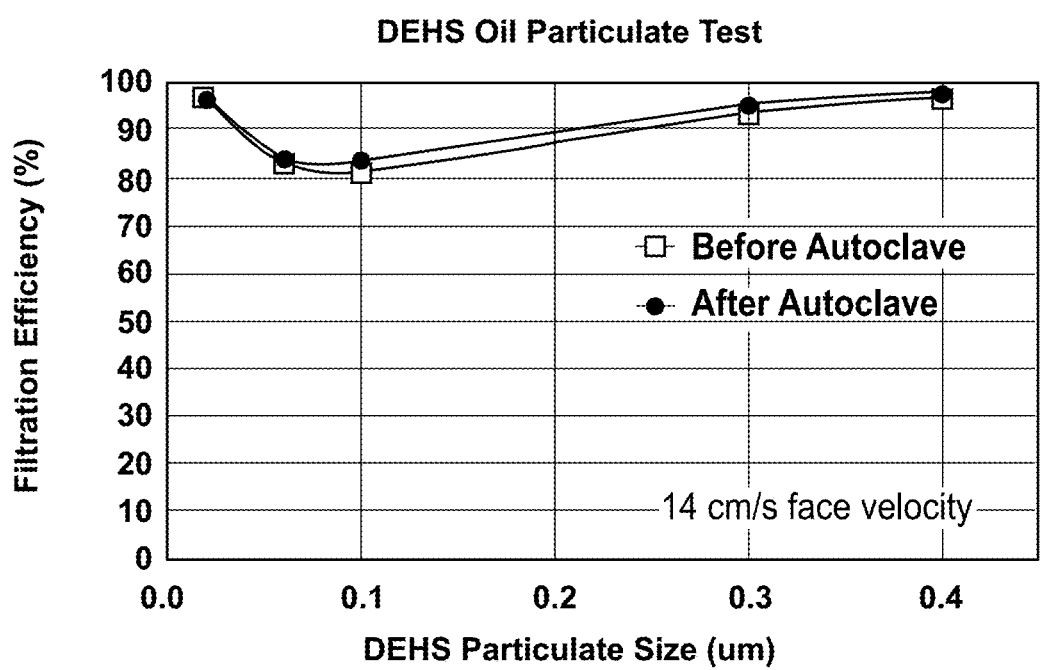
FIG. 12C is a plot of filtration efficiency of electrospun nanofibers deposited on a cotton substrate as a function of particle size before and after sanitization by autoclaving, with the efficiency being measured by a series of oil tests using diethylhexyl sebacate (DEHS) particles of different sizes.

FIG. 12C is a plot of filtration efficiency of electrospun nanofibers deposited on a cotton substrate as a function of particle size before and after sanitization by autoclaving. The measurements were performed by a series of oil tests using diethylhexyl sebacate (DEHS) particles of different sizes (e.g., 0.02 microns, 0.06 microns, 0.1 microns, 0.3 microns, and 0.4 microns, respectively). The electrospun media exhibited greater than 80% filtering efficiency for a range of monodispersed DEHS particulate sizes at a face velocity of 14 cm/s. The two curves of FIG. 12C show that the filtration efficiency of the media does not degrade due to sanitization by autoclaving.

In embodiments, a nanofiber filter medium, as described herein, may include an anti-pathogen compound to kill bacteria and/or viruses. As previously discussed, the anti-pathogen agent may be applied to nanofibers of the nanofiber filter medium after the formation of the nanofibers. In embodiments, the anti-pathogen agent is added to the electrospinning material and the anti-pathogen agent is incorporated into the molecular structure of the nanofibers, and may be uniformly distributed in the nanofibers.

Figure 13A:
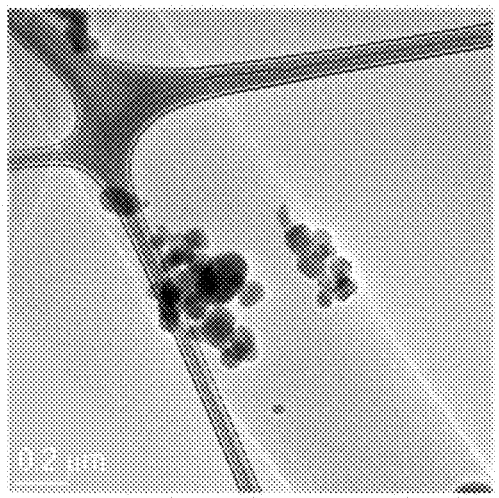
FIG. 13A is a low magnification bright field TEM image of nanofibers having anti-pathogen agents incorporated into the structure of the nanofibers.
Figure 13B:
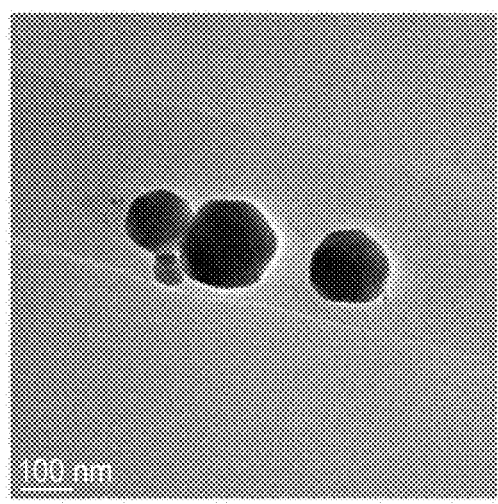
FIG. 13B is a high magnification TEM image of a portion of a nanofiber having anti-pathogen agents incorporated into the structure of the nanofiber.
Figure 13C:
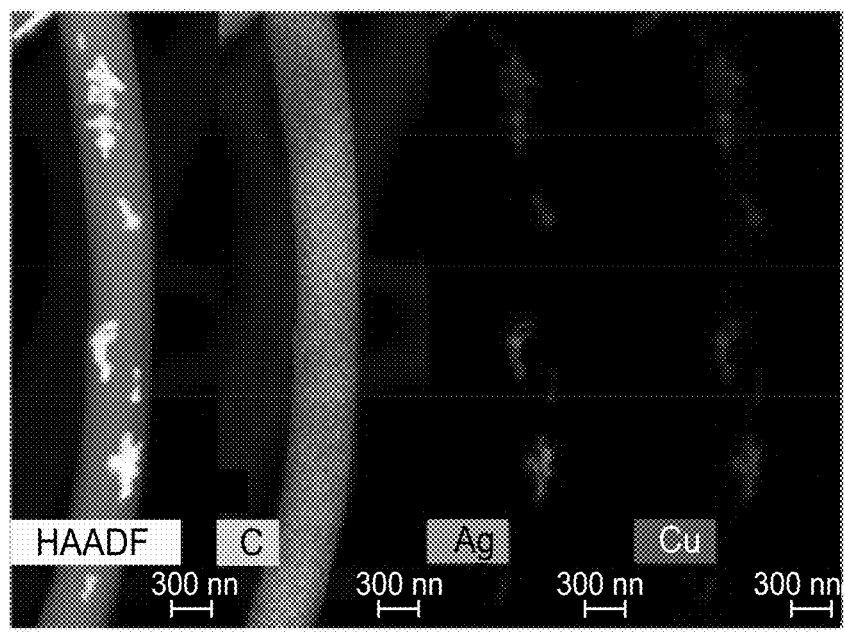
FIG. 13C is multiple high angle annular dark field (HAADF) images and energy dispersive spectroscopy (EDS) elemental mapping of a portion of a nanofiber taken at the scanning transmission electron microscopy (STEM) mode, which show special distribution and composition of anti-pathogen agents.

FIG. 13A is a low magnification bright field TEM image of nanofibers having anti-pathogen agents incorporated into the structures of the nanofibers. FIG. 13B is a high magnification TEM image of a portion of a nanofiber having anti-pathogen agents incorporated into the structure of the nanofiber. FIG. 13C shows high angle annular dark field (HAADF) images and energy dispersive spectroscopy (EDS) elemental mapping of a portion of a nanofiber taken at the scanning transmission electron microscopy (STEM) mode, which show special distribution and composition of anti-pathogen agents. The anti-pathogen agent is introduced into the material 207, see FIG. 2A, and uniformly distributed through the material 207 before being incorporated into the nanofibers through electrospinning of the nanofiber matrix. The anti-pathogen of 13A-13C includes a plurality of nanoparticles. FIG. 13C shows STEM dark field imaging to show the spatial distribution of anti-pathogen agents in the nanofiber structures. FIG. 13C further shows EDS elemental mapping of the sample, which confirms the presence of an anti-pathogen of CuAg alloy nanoparticles. In embodiments, the anti-pathogen may be uniformly distributed in the fibers to improve the efficacy of the anti-pathogen in killing bacteria and/or viruses. Also, by including the anti-pathogen in the structure of the nanofibers, the entrapped anti-pathogen agents are less likely to leach out of the nanofibers, which would reduce the risks that the nanoparticles are inhaled by people who wear the facemasks. The antiviral efficacy of such a sample (e.g., the CU alloy sample of FIG. 13C) is shown in FIG. 14B.

Figure 14A:
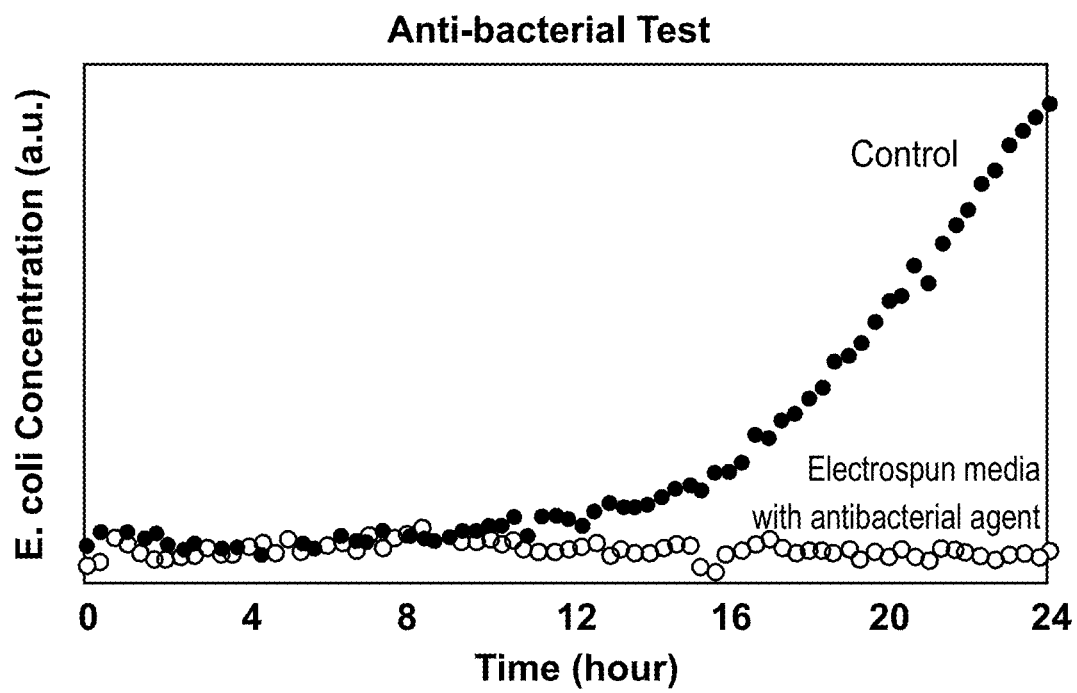
FIG. 14A is a plot of *E-coli* concentration over time recorded during antibacterial tests for sets of nanofibers including nanofibers having an anti-bacterial agent.

FIG. 14A is a plot of *E-coli* concentration over time for two sets of nanofibers for a nanofiber filter medium. One of the sets of nanofibers is a control set that does not contain an anti-pathogen agent, and the other set of polymer nanofibers has an anti-bacterial as an anti-pathogen agent. The set of anti-bacterial polymer nanofibers have a composition of 10 wt % of 5-chloro-2-(2,4-dichloro-phenoxy)phenol in 90% of 7:3 polyacrylonitrile:polybenzimidazole composite polymer with polyacrylonitrile:polybenzimidazole ratio of 7:3. *E. coli* was placed on top of each of the sets of nanofibers, and a culture solution was provided to the *E. coli* to facilitate replication of the *E. coli*. The trends on the plot of FIG. 14A show that after 24 hours, the *E. coli* concentration was increasing for the control nanofibers. The nanofibers having the ANL anti-bacterial media showed no noticeable replication of the *E. coli* over the 24 hours. FIG. 14A illustrates that according to the disclosed nanofibers and fabrication methods, reusable nanofiber filter mediums having anti-bacterial compounds can be fabricated for use in reusable PPE.

Figure 14B:
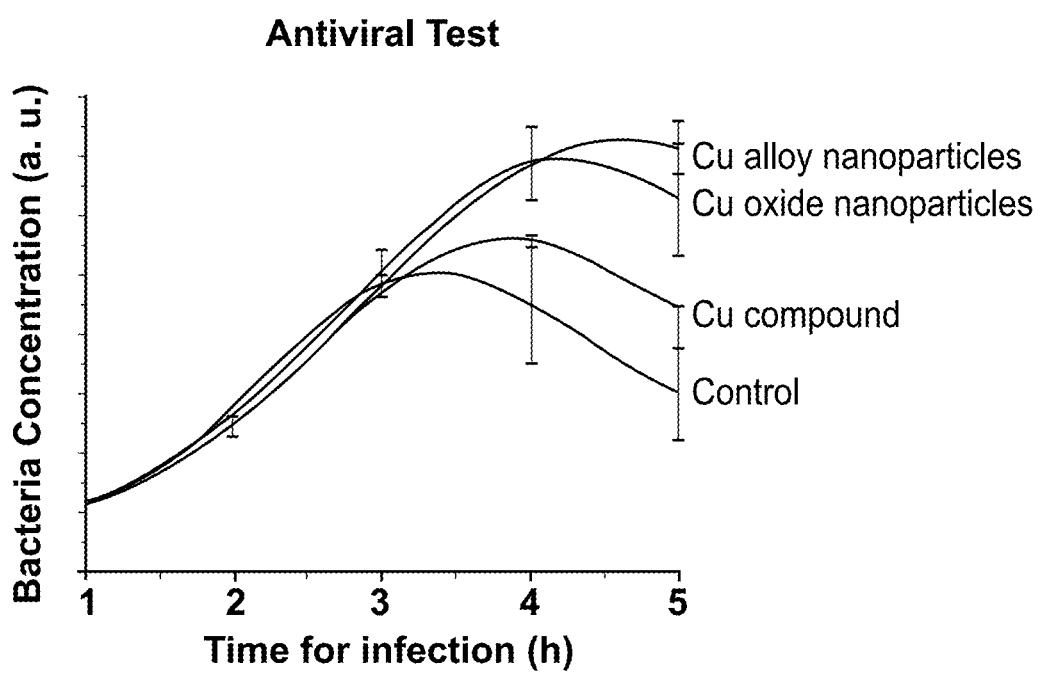
FIG. 14B is a plot of *E-coli* bacteria concentration over time recorded during antiviral tests for four sets of nanofibers including nanofibers having different anti-viral agents.

FIG. 14B is a plot of bacteria concentration over time for four sets of nanofibers for a nanofiber filter medium. The four sets of nanofibers include a control that does not contain an anti-pathogen agent, and three sets of polymer nanofibers having different anti-viral anti-pathogen agents. The three anti-viral agents are copper alloy (i.e., CuAg) nanoparticles, copper oxide nanoparticles, and a copper compound (i.e., copper (II) acetylacetonate). A SARS-CoV2 surrogate virus, a PhiX174 bacteriophage was used for the anti-viral tests. The bacteriophage kills *E. coli* bacteria; therefore, monitoring the growth of bacteria can be used to determine the presence of the bacteriophage. Bacteria was provided to each of the sets of nanofibers and the presence of bacteria was determined to decrease most in the control, which is indicative of replication of the bacteriophage. The three sets of nanofibers having anti-viral agents all showed that the bacteria replicated over time to much higher peaks than the control fibers, indicating that the anti-viral agents in the nanofibers effectively killed the bacteriophage and thus allowed the bacteria reproduction.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A reusable filtration element for personal protective equipment, the filter comprising: a fabric substrate; a layer of polymer nanofibers electrospun on a surface of the fabric substrate; and an anti-pathogen agent, wherein: the layer of polymer nanofibers has a thickness between 20 and 70 micrometers, each of the nanofibers comprises one of the group consisting of: polypropylene, polyacrylonitrile, polyimide, polybenzimidazole, polyethylene terephthalate, poly(m-phenylene isophthalamide), and poly(vinylidene fluoride-co-hexafluoropropylene), each of the nanofibers has a diameter of less than 2 micrometers, the layer of polymer nanofibers comprises nanofibers that are structurally stable at temperatures up to 300° C., and the reusable filtration element has a face velocity of greater than 14 cm/s and smaller than 23 cm/s, and a pressure drop of less than 25 mmH2O.

A. A reusable filtration element for personal protective equipment, the filter comprising: a flexible substrate; a layer of nanofibers electrospun on a surface of the flexible substrate.

A+1. The reusable filtration element of aspect A, wherein the layer of nanofibers comprises nanofibers having a diameter of less than 2 micrometers.

A+2. The reusable filtration element of either aspect A or A+1, wherein the layer of nanofibers comprises polymer nanofibers.

A+3. The reusable filtration element of aspect A+2, wherein the polymer nanofibers comprise one of polypropylene, polyacrylonitrile, polyimide, polybenzimidazole, polyethylene terephthalate, poly(m-phenylene isophthalamide), and poly(vinylidene fluoride-co-hexafluoropropylene).

A+4. The reusable filtration element of any of aspects A to A+3, wherein the layer of nanofibers comprises nanofibers having an anti-pathogen agent.

A+5. The reusable filtration element of aspect A+4, wherein the anti-pathogen agent comprises one of 4,5-dichloro-2-n-octyl-4-isothiazolin-3-one and 5-chloro-2-(2,4-dichloro-phenoxy)phenol.

A+6. The reusable filtration element of either aspect A+4 or A+5, wherein the anti-pathogen agent comprises an anti-bacterial agent.

A+6. The reusable filtration element of any of aspects A+4 to A+5, wherein the anti-pathogen agent comprises an anti-viral agent.

A+7. The reusable filtration element of any of aspects A to A+6, wherein the layer of nanofibers comprises a plurality of nanofiber sublayers.

A+8 The reusable filtration element of aspect A+7, wherein the plurality of nanofiber sublayers comprises: a first nanofiber sublayer comprising nanofibers having diameters of less than 500 nanometers; and a second nanofiber sublayer comprising nanofibers having diameters between 500 nanometers and 2 micrometers.

A+9. The reusable filtration element of any of aspects A to A+6, wherein the layer of nanofibers comprises a single layer of nanofibers having a plurality of diameters between 300 nanometers and 1600 nanometers.

A+10. The reusable filtration element of any of aspects A to A+9, wherein the layer of nanofibers comprises nanofibers that are structurally stable at temperatures up to 300° C.

A+11. The reusable filtration element of any of aspects A to A+10, wherein the reusable filtration element has a face velocity of greater than 14 cm/s.

A+12. The reusable filtration element of any of aspects A to A+11, wherein the reusable filtration element has a pressure drop of less than 45 mmH2O.

A+13. The reusable filtration element of any of aspects A to A+12, wherein the layer of polymer nanofibers has a thickness between 20 and 70 micrometers.

A+14 The reusable filtration element of any of aspects A to A+12, wherein the layer of polymer nanofibers is less than 100 micrometers thick.

B. A method for fabricating a reusable filtration element for personal protective equipment, the method comprising: physically configuring a flexible substrate relative to a nozzle, wherein the flexible substrate is configured to receive nanofibers thereon; providing a voltage between the flexible substrate and a region around the nozzle; pumping a material through the nozzle to electrospin a layer of nanofibers onto the flexible substrate.

B+1. The method of aspect B, wherein the layer of nanofibers comprises nanofibers having a diameter of less than 2 micrometers.

B+2. The method of either aspect B or aspect B+1, wherein the layer of nanofibers comprises polymer nanofibers.

B+3. The method of aspect B+2, wherein the polymer nanofibers comprise one of polypropylene, polyacrylonitrile, polyimide, polybenzimidazole, polyethylene terephthalate, poly(m-phenylene isophthalamide), and poly(vinylidene fluoride-co-hexafluoropropylene).

B+4. The method of any of aspects B to B+3, wherein the layer of nanofibers comprises nanofibers having an anti-pathogen agent.

B+5. The method of aspect B+4, wherein the anti-pathogen agent comprises one of 4,5-dichloro-2-n-octyl-4-isothiazolin-3-one and 5-chloro-2-(2,4-dichloro-phenoxy)phenol.

B+6. The method of either aspect B+4 or B+5, wherein the anti-pathogen agent comprises an anti-bacterial agent.

B+7. The method of any of aspects B+4 to B+6, wherein the anti-pathogen agent comprises an anti-viral agent.

B+8. The method of aspect B+7, wherein the antiviral agent comprises one of CuAg nanostructures, CuZn nanostructures, CuOx nanostructures, NuZnFeOx nanostructures, CuZnOx nanostructures, CuAl nanostructures, a CU based nanostructures, a Zn based nanostructures, an Fe based nanostructures, an Ag based nanostructures, a copper compound, a Zn compound, a Fe compound, or a Ag compound.

B+8. The method of any of aspects B to B+7, wherein the layer of nanofibers comprises a plurality of nanofiber sublayers.

B+9. The method of aspect B+8, wherein the plurality of nanofiber sublayers comprises: a first nanofiber sublayer comprising nanofibers having diameters of less than 500 nanometers; and a second nanofiber sublayer comprising nanofibers having diameters between 500 nanometers and 2 micrometers.

B+10. The method of any of aspects B to B+7, wherein the layer of nanofibers comprises a single layer of nanofibers having a plurality of diameters between 300 nanometers and 1600 nanometers.

B+11. The method of any of aspects B to B+10, wherein the layer of nanofibers comprises nanofibers that are structurally stable at temperatures up to 300° C.

B+12. The method of any of aspects B to B+11, wherein the reusable filtration element has a face velocity of greater than 14 cm/s.

B+13. The method of any of aspects B to B+12, wherein the reusable filtration element has a pressure drop of less than 25 mmH2O.

B+14. The method of any of aspects B to B+13, wherein the layer of polymer nanofibers has a thickness between 20 and 70 micrometers.

B+15. The method of any of aspects B to B+13, wherein the layer of polymer nanofibers is less than 100 micrometers thick.

What is claimed is:

1. A reusable filtration element for personal protective equipment, the reusable filtration element comprising:
   a fabric substrate;
   a layer of polymer nanofibers electrospun on a surface of the fabric substrate, the layer of polymer nanofibers having a thickness between 20 and 70 micrometers, each of the nanofibers having a diameter of 2 micrometers or less, and each of the nanofibers comprising polybenzimidazole; and
   an anti-pathogen agent,
   wherein:
   the layer of polymer nanofibers comprises nanofibers that are structurally stable at temperatures up to 300° C.,
   the reusable filtration element has a face velocity of greater than 14 cm/s at a pressure drop of less than 25 mmH$_2$O, and
   the anti-pathogen agent comprises one of a CuZn alloy nanoparticle, 4,5-dichloro-2-n-octyl-4-isothiazolin-3-one, or 5-chloro-2-(2,4-dichloro-phenoxy) phenol.

2. A reusable filtration element for personal protective equipment, the reusable filtration element comprising:
   a flexible substrate;
   a layer of nanofibers electrospun on a surface of the flexible substrate, the nanofibers including an anti-pathogen agent comprising a CuZn alloy nanoparticle, the nanofibers comprising a material that does not melt below a temperature of 300° C., and the nanofibers comprising polybenzimidazole;
   wherein:
   the reusable filtration element has a face velocity of greater than 14 cm/s at a pressure drop of less than 25 mmH$_2$O.

3. The reusable filtration element of claim 2, wherein the layer of nanofibers comprises a plurality of nanofiber sublayers.

4. The reusable filtration element of claim 3, wherein the plurality of nanofiber sublayers comprises:
   a first nanofiber sublayer comprising nanofibers having diameters of less than 500 nanometers; and
   a second nanofiber sublayer comprising nanofibers having diameters between 500 nanometers and 2 micrometers.

5. The reusable filtration element of claim 2, wherein the layer of nanofibers comprises nanofibers that are structurally stable at temperatures up to 300° C.

6. The reusable filtration element of claim 2, wherein the layer of nanofibers is less than 100 micrometers thick.

7. The reusable filtration element of claim 2, wherein the flexible substrate is one of the group consisting of: a cloth sheet configured to cover a bed, a cloth material of a facemask, and a cloth configured to be worn by a person.

8. The reusable filtration element of claim 2, wherein the nanofibers comprise polyacrylonitrile: polybenzimidazole nanofibers with a composition of 7 to 3 polyacrylonitrile to polybenzimidazole.

9. A method for fabricating a reusable filtration element for personal protective equipment, the method comprising:
 physically configuring a flexible substrate relative to a nozzle, wherein the flexible substrate is configured to receive nanofibers thereon;
 providing a voltage between the flexible substrate and a region adjacent to the nozzle;
 pumping a material through the nozzle to electrospin a layer of nanofibers onto the flexible substrate, the material comprising polybenzimidazole, the layer of nanofibers comprising a material that does not melt below a temperature of 300° C.; and
 providing to the nanofibers an anti-pathogen agent including a CuZn alloy nanoparticle;
 wherein:
 the reusable filtration element has a face velocity of greater than 14 cm/s at a pressure drop of less than 25 mmH$_2$O.

10. The method of claim 9, wherein the layer of nanofibers comprises nanofibers having a diameter of less than 2 micrometers.

11. The method of claim 9, wherein the anti-pathogen agent is a structural component or part of the composition of the nanofibers.

12. The method of claim 9, wherein the layer of nanofibers comprises a plurality of nanofiber sublayers.

13. The method of claim 9, wherein the layer of nanofibers comprises a single layer of nanofibers having a plurality of diameters between 300 nanometers and 1600 nanometers.

14. The method of claim 9, wherein the layer of nanofibers comprises nanofibers that are structurally stable at temperatures up to 300° C.

15. The method of claim 9, wherein the layer of nanofibers is less than 100 micrometers thick.

16. The method of claim 9, wherein the flexible substrate is one of the group consisting of: a cloth sheet configured to cover a bed, a cloth material of a facemask, and a cloth configured to be worn by a person.

* * * * *